(12) United States Patent
Gilfix et al.

(10) Patent No.: US 7,188,345 B2
(45) Date of Patent: Mar. 6, 2007

(54) INSTALLATION OF DATA-DRIVEN BUSINESS INTEGRATION ADAPTERS

(75) Inventors: Michael Gilfix, Austin, TX (US); Jerry Walter Malcolm, Austin, TX (US); Foluso Olaiya Okunseinde, Austin, TX (US); Tyron Jerrod Stading, Austin, TX (US); Paul Stuart Williamson, Round Rock, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 10/392,765

(22) Filed: Mar. 19, 2003

(65) Prior Publication Data
US 2004/0187095 A1 Sep. 23, 2004

(51) Int. Cl.
G06F 3/00 (2006.01)
G06F 9/44 (2006.01)
G06F 9/46 (2006.01)
G06F 13/00 (2006.01)

(52) U.S. Cl. .................................................. 719/313
(58) Field of Classification Search ........ 719/310–320, 719/328–330
See application file for complete search history.

(56) References Cited

U.S. PATENT DOCUMENTS

| 6,499,036 | B1 | 12/2002 | Gurevich | 707/103 |
| 2002/0116454 | A1 | 8/2002 | Dyla et al. | 709/203 |
| 2002/0184264 | A1 | 12/2002 | Berg et al. | 707/513 |
| 2003/0014617 | A1 | 1/2003 | Tamboli et al. | 713/1 |
| 2003/0037174 | A1* | 2/2003 | Lavin et al. | 709/313 |
| 2003/0084203 | A1* | 5/2003 | Yoshida et al. | 709/328 |
| 2003/0110315 | A1* | 6/2003 | Upton | 709/328 |
| 2005/0223108 | A1* | 10/2005 | Maffeis et al. | 709/232 |
| 2006/0059107 | A1* | 3/2006 | Elmore et al. | 705/64 |

OTHER PUBLICATIONS

Fox et al, Status of Hand-held Interface to Garnet Collaborative Environment, Community Grids Laboratory, Indiana University, Jan. 24, 2002.*
Rine et al, Using Adapters to Reduce Interaction Complexity in Reusable Component-Based software Development, ACM 1999, pp. 37-43.*
IBM, Adapter Architecture.*

* cited by examiner

Primary Examiner—William Thomson
Assistant Examiner—Diem Cao
(74) Attorney, Agent, or Firm—Mark S. Walker; John Biggers; Biggers & Ohanian, LLP

(57) ABSTRACT

Software application integration including providing a multiplicity of predefined data communications receivers, each receiver specific to a software application and a communications protocol; providing a multiplicity of predefined data communications senders, each sender specific to a software application and a communications protocol; providing one or more transports, each transport having the capability of configuring itself, in dependence upon configuration parameters from a profile, with a receiver and a sender; providing a multiplicity of predefined transfer managers; providing an adapter profile identifying communications transports, including receivers and senders, and, optionally, one or more transfer managers, wherein the adapter profile includes configuration parameters for the data communications transports and the transfer managers; and constructing an application integration adapter in dependence upon the profile, wherein the adapter comprises the transports, receivers, senders, and the transfer managers identified in the profile.

24 Claims, 21 Drawing Sheets

INSTALLATION OF DATA-DRIVEN BUSINESS INTEGRATION ADAPTERS

BACKGROUND OF THE INVENTION

1. Field of the Invention

The field of the invention is data processing, or, more specifically, methods, systems, and products for software application integration.

2. Description of Related Art

Software applications integration is crucial in improving productivity and reducing costs. By streamlining and integrating business processes, companies can greatly reduce operational overhead. By connecting business support systems and operational support systems, applications are able to work in harmony without costly intervention. By moving away from point-to-point messaging, companies gain the benefits of a centralized messaging infrastructure: greater control over business processes and increased operational efficiency.

In the past, software applications integration has been achieved only with high cost. Components of business support systems and operational support systems are often developed and manufactured by separate manufacturers or developers, utilize disparate data structures to encode the same data and utilize disparate modes of data communications. An inventory control application from one developer may post inventory changes, for example, across TCP/IP to a general ledger developed by an entirely different company. The same inventory control application may post in HTML through HTTP to a purchasing system from a third vendor using a third set of data structures. The purchasing system may post to the general ledger, using a third combination of data structures. And so on. The combinations are endless. And in the past, each such integration was accomplished by hiring systems analysts, software development project managers, software system architects, senior programmers, junior programmers, and so on, to build application integration adapters to convert the data structures and administer the data communications among all these disparate software application systems.

Such application integration adapters have typically been implemented in a so-called 'point-to-point' fashion. That is, an adapter is developed to couple this particular inventory application through this particular data communications coupling using this particular data communications protocol to this particular general ledger. Adding a new application to the mix required all the same new development costs as for the first two applications to be integrated. For all these reasons, it would be advantageous to have improved means and methods for application integration.

SUMMARY OF THE INVENTION

Exemplary embodiments of the invention include methods of application integration. Exemplary embodiments include providing a multiplicity of predefined data communications receivers, each receiver specific to a software application and a communications protocol, and providing a multiplicity of predefined data communications senders, each sender specific to a software application and a communications protocol. Such embodiments include providing one or more transports, each transport having the capability of configuring itself, in dependence upon configuration parameters from a profile, with a receiver and a sender, and providing a multiplicity of predefined transfer managers. Typical embodiments include providing an adapter profile identifying communications transports, including receivers and senders, and, optionally, one or more transfer managers, in which the adapter profile includes configuration parameters for the data communications transports and the transfer managers, and constructing an application integration adapter in dependence upon the profile, in which the adapter includes the transports, receivers, senders, and the transfer managers identified in the profile.

In exemplary embodiments of the invention, configuration parameters include identifications of data communications protocols and identifications of software applications. In such embodiments, providing an adapter profile includes inserting into the adapter profile identifications of data communications protocols and identifications of software applications. In typical embodiments, inserting into the adapter profile identifications of data communications protocols includes inserting data communication parameters for the data communication protocols.

In exemplary embodiments of the invention, providing an adapter profile includes selecting two or more of the provided predefined data communications receivers for inclusion in the adapter, and selecting two or more of the provided predefined data communications senders for inclusion in the adapter, in which the selected senders are specific to the same software applications to which the receivers are specific. In such embodiments, providing an adapter profile includes selecting two or more of the provided predefined data transports for inclusion in the adapter. In typical embodiments, providing an adapter profile includes selecting one or more of the provided predefined transfer managers. Exemplary embodiments include communicating integration messages among applications through the adapter.

Exemplary embodiments of the invention include methods of application integration, including providing a predefined adapter, providing a predefined transport, receiver, and sender for a first application, and developing a transport for a second application. Such embodiments also include developing a new sender for the second application, developing a new receiver for the second application, and optionally providing transfer managers for the second application. Typical embodiments include providing an adapter profile identifying at least the two predefined communications transports, including the senders and receivers, and, optionally, one or more transfer managers, in which the adapter profile includes configuration parameters for the data communications transports and the optional transfer managers, and starting the adapter.

In exemplary embodiments of the invention, developing a new receiver for the second application includes programming the new receiver to administer data communication between the second application and the adapter in accordance with a communications protocol for the second application. In such embodiments, developing a new receiver for the second application includes programming a mapping of data elements of the second application from a source message format to a destination message format useful to the destination application. In typical embodiments, developing a new receiver for the second application includes programming a mapping of data elements of the second application from a source message format to an interim message format useful for internal processing within the adapter.

In exemplary embodiments of the invention, developing a new sender for the second application includes programming the new sender to administer data communications between the second application and the adapter in accordance with the identified communications protocol for the second application. In such embodiments, developing a new sender for the second application includes programming a mapping of data elements of the second application from a destination message format useful to the destination application to a source message format. In typical embodiments, developing a new sender for the second application includes programming a mapping of data elements of the second application from an interim message format useful for data translation to a source message format.

In exemplary embodiments of the invention, providing transfer managers includes providing a predefined transfer manager for the second application. In typical embodiments, providing transfer managers includes developing a new transfer manager for the second application. In such embodiments, developing a new transfer manager for the second application includes programming, in an interim message format, a transformation of the data elements from the second application into data elements useful in the first application. In exemplary embodiments, developing a new transfer manager for the second application includes programming, in the interim message format, a transformation of the data elements from the first application into data elements useful in the second application.

In exemplary embodiments of the invention, starting the adapter includes creating the transports identified in the adapter profile, configuring the transports in accordance with the configuration parameters, creating any transfer managers identified in the profile, and configuring instantiated transfer managers in dependence upon the configuration parameters. In such embodiments, configuring the transports includes creating a receiver for each transport, creating a transport event listener, registering the transport event listener with each receiver, and creating a sender for each transport.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
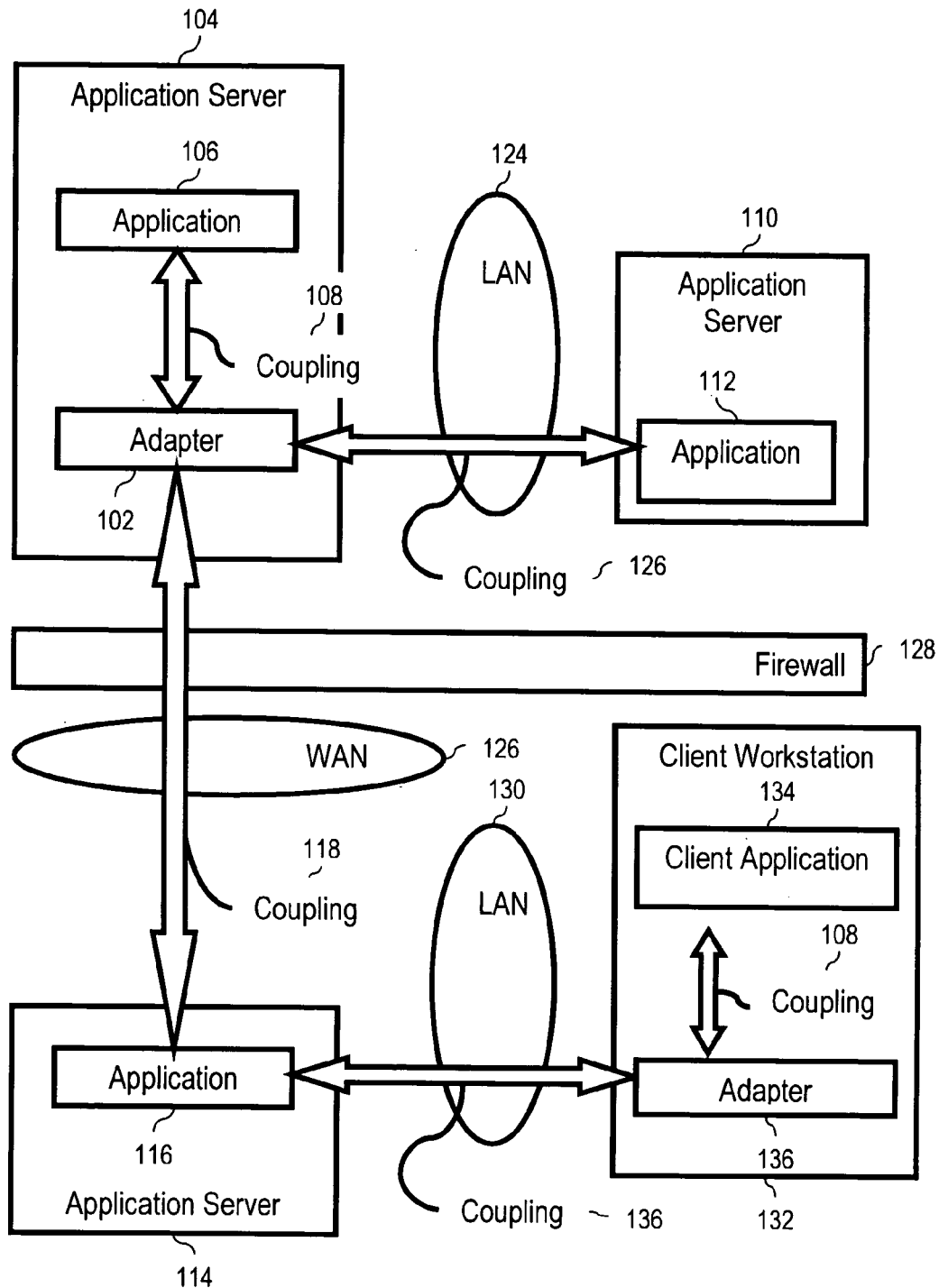
FIG. 1 is a block diagram illustrating architectural aspects of application integration adapters according to various embodiments of the present invention.

The present invention is described to a large extent in this specification in terms of methods for software application integration. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the terms "field," "data element," and "attribute," unless the context indicates otherwise, generally are used as synonyms, referring to individual elements of digital data. Aggregates of data elements are referred to as "records" or "data structures." Aggregates of records are referred to as "tables" or "files." Aggregates of files or tables are referred to as "databases." Complex data structures that include member methods, functions, or software routines as well as data elements are referred to as "classes." Instances of classes are referred to as "objects" or "class objects."

"802.11" refers to a family of specifications developed by the IEEE for wireless LAN technology. 802.11 specifies an over-the-air interface between a wireless client and a base station or between two wireless clients.

"API" is an abbreviation for "application programming interface." An API is a set of routines, protocols, and tools for building software applications.

"Bluetooth" refers to an industrial specification for a short-range radio technology for RF couplings among client devices and between client devices and resources on a LAN or other network. An administrative body called the Bluetooth Special Interest Group tests and qualifies devices as Bluetooth compliant. The Bluetooth specification consists of a 'Foundation Core,' which provides design specifications, and a 'Foundation Profile,' which provides interoperability guidelines.

"CORBA" means the Common Object Request Broker Architecture, a standard for remote procedure invocation first published by the Object Management Group ("OMG") in 1991. CORBA can be considered a kind of object-oriented way of making "RPCs" or remote procedure calls, although CORBA supports many features that do not exist in RPC as such. By use of CORBA technology, remote method invocations effected in object-oriented programming languages such as Java™ and C++ look like invocations of local member methods in local objects.

CORBA data communications are administered by middleware applications known as Object Request Brokers or 'ORBs.' ORBs communicate with "GIOP," the General Inter-ORB Protocol, the CORBA protocol that defines structures and formats for passing messages among heterogeneous computers and their various architectures. GIOP is not based on any particular network protocol, such as IPX or TCP/IP. GIOP defined to function over its most widely used communication transport platform, TCP/IP, is called "IIOP," the Internet Inter-ORB Protocol. Because of the general usefulness of TCP/IP, this disclosure, in describing example embodiments, tends to use the terms GIOP and IIOP more or less interchangeably, although the use of the term IIOP is not intended to limit application of embodiments of the present invention to the single transport protocol suite TCP/IP.

"CGI" means "Common Gateway Interface," a standard technology for data communications of resources between web servers and web clients. More specifically, CGI provides a standard interface between servers and server-side 'gateway' programs which administer actual reads and writes of data to and from file systems and databases. The CGI interface typically sends data to gateway programs through environment variables or as data to be read by the gateway programs through their standard inputs. Gateway programs typically return data through standard output.

"Coupled for data communications" means any form of data communications, wireless, 802.11b, Bluetooth, infrared, radio, internet protocols, HTTP protocols, email protocols, networked, direct connections, dedicated phone lines, dial-ups, serial connections with EIA232 (RS-232), IEEE 1394 (often called 'Firewire' connections, a trademark of Apple Computer, Inc.), Universal Serial Buses ("USB"), hard-wired parallel port connections, and other forms of data communications as will occur to those of skill in the art. Couplings for data communications include sharing of files, including transferring files from application to application, from an adapter to an application, or from an application to an adapter, including flat files, binary files, text files, database files, HTML files, XML documents, and so on.

"DCOM" means 'Distributed Component Object Model,' an extension of Microsoft's Component Object Model ("COM") to support objects distributed across networks. DCOM is part of certain Microsoft™ operating systems, including Windows NT™, and is available for other operating systems. DCOM serves the same purpose as IBM's DSOM protocol, which is a popular implementation of CORBA. Unlike CORBA, which runs on many operating systems, DCOM is currently implemented only for Windows.

"Format" or "data format" refers to the overall form of data encoding for data processing and data communications. Examples of data formats include data encoded in the form of HTML documents, XML documents, Java data structures, C++ data structures, C data structures, and so on. In addition to format, computer data has structure, including data element names, data element types, and data element values. In this disclosure, changing or converting the format of data is referred to as "data translation," "translation," or "translating." In this disclosure, changing or converting the structure of data is referred to as "data transformation," "transformation," or "transforming."

"HTML" stands for 'HyperText Markup Language,' a standard markup language for displaying web pages on browsers.

"HTTP" stands for 'HyperText Transport Protocol,' the standard data communications protocol of the World Wide Web.

"JMS" means 'Java Message Service,' a Java API specifically designed for application integration messaging. JMS provides a kind of Java enterprise bean that supports asynchronous administration of message traffic. JMS messages can participate in transactions controlled through the Java Transaction API ("JTA"). The JTA operates in coordination with the Java Transaction Service ("JTS"). JTA allows applications and application servers to access transactions. JTS specifies the implementation of a Transaction Manager that supports JTA and implements the Java mapping of the OMG Object Transaction Service ("OTS") at the level below the API. JTS propagates transactions using IIOP.

"IMAP" means 'Internet Message Access Protocol.' IMAP is a protocol for retrieving email messages from Internet email servers. In "offline" operation, an email client fetches messages from an email server to the client machine where the email client program is running, and then deletes the email messages from the server. In "online" operation, messages can be left on the email server and manipulated remotely by email client programs. POP supports offline email operations. IMAP, the newer protocol, supports both offline and online email operations.

"LAN" means 'local area network.'

"Network" is used in this specification to mean any networked coupling for data communications among computers or computer systems. Examples of networks useful with the invention include intranets, extranets, internets, local area networks, wide area networks, and other network arrangements as will occur to those of skill in the art.

"POP" means 'Post Office Protocol.' POP is a protocol used by an email client to retrieve email from a mail server. There are two versions of POP. POP2 requires SMTP to receive email messages from clients or other servers. The newer version, POP3, can be used with or without SMTP.

"Pseudocode" is exemplary source code in a programming language or examples of markup in a markup language that is used for explanation in this disclosure. Pseudocode is not represented as conforming strictly to the requirements of any particular programming language or markup language, so that there is no representation that pseudocode examples from this disclosure will compile or execute. Pseudocode examples will, however, help with explanation so as to enable persons of skill in the art to make and use application integration adapters according to embodiments of the present invention.

"RMI" refers to 'Remote Method Invocation,' a protocol set developed by Sun Microsystems to enables Java objects to communicate remotely with other Java objects. RMI is a relatively simple protocol, but unlike more complex protocols such as CORBA and DCOM, it works only with Java objects. CORBA and DCOM support networked communications and remote procedure calls among objects created in any language.

"Server" in this specification refers to a computer or device comprising automated computing machinery on a network that manages resources and requests for access to resources. A "security server" can be any server that manages access to resources by use of security objects according to the present invention. A "web server," or "HTTP server," in particular is a server that communicates with browsers by means of HTTP in order to manage and make available to networked computers documents in markup languages like HTML, digital objects, and other resources.

A "Servlet," like an applet, is a program designed to be run from another program rather than directly from an operating system. "Servlets" in particular are designed to be run on servers from a conventional Java interface for servlets. Servlets are modules that extend request/response oriented servers, such as Java-enabled web servers. Java servlets are an alternative to CGI programs. The biggest difference between the two is that a Java servlet is persistent. Once a servlet is started, it stays in memory and can fulfill multiple requests. In contrast, a CGI program disappears after it has executed once, fulfilling only a single a request for each load and run. The persistence of Java servlets makes them generally faster than CGI because no time is spent on loading servlets for invocations after a first one.

"SMTP" means 'Simple Message Transfer Protocol.' SMTP is a protocol for sending email messages between server. Internet email traffic largely travels over SMTP from server to server. After email arrives at a target server, email messages are then retrieved from the server with an email client using either POP or IMAP or. SMTP also is used to send messages from mail clients to mail servers.

"SOAP" is the Simple Object Access Protocol, a protocol for applications communications over the Internet, independent of platform. SOAP includes a convention for representing remote procedure calls and responses. SOAP can potentially be used with a variety of transport protocols, although as a practical matter to date, it is used mostly with HTTP. SOAP generally uses XML to define message formats and then adds HTTP headers for data communications.

"TCP/IP" refers to two data communications protocols implementing the network layer and the transport layer of the standard ISO protocol stack for data communications protocols. Strictly speaking, "TCP," the "Transmission Control Protocol," is a separate layer residing above "IP," the "Internet Protocol." The two are often spoken of together, however, as the 'TCP/IP protocol suite.'

A "URI" or "Universal Resource Identifier" is an identifier of a named object in any namespace accessible through a network. URIs are functional for any access scheme, including for example, the File Transfer Protocol or "FTP," Gopher, and the web. A URI as used in typical embodiments of the present invention usually includes an internet protocol address, or a domain name that resolves to an internet protocol address, identifying a location where a resource, particularly a web page, a CGI script, or a servlet, is located on a network, usually an internet, a net work using the Internet Protocol in its ISO network layer. URIs directed to particular resources, such as particular HTML files, CGI scripts, or servlets, typically include a path name or file name locating and identifying a particular resource in a file system coupled through a server to a network. To the extent that a particular resource, such as a CGI file or a servlet, is executable, for example to store or retrieve data, a URI often includes query parameters, or data to be stored, in the form of data encoded into the URI. Such parameters or data to be stored are referred to as 'URI encoded data.'

"URLs" or "Universal Resource Locators" comprise a kind of subset of URIs, wherein each URL resolves to a network address. That is, URIs and URLs are distinguished in that URIs identify named objects in namespaces, where the names may or may not resolve to addresses, while URLs do resolve to addresses. Although standards today are written on the basis of URIs, it is still common to such see web-related identifiers, of the kind used to associate web data locations with network addresses for data communications, referred to as "URLs." This specification refers to such identifiers generally as URIs.

"WAN" means 'wide area network.' An example of a WAN is the Internet.

"World Wide Web," or more simply "the web," refers to a system of internet protocol ("IP") servers that support specially formatted documents, documents formatted in markup languages such as HTML, XML (eXtensible Markup Language), WML (Wireless Markup Language), or HDML (Handheld Device Markup Language). The term "Web" is used in this specification also to refer to any server or connected group or interconnected groups of servers that implement a hyperlinking protocol, such as HTTP or WAP (the 'Wireless Access Protocol'), in support of URIs and documents in markup languages, regardless of whether such servers or groups of servers are coupled to the World Wide Web as such.

"XML" refers to the 'eXtensible Markup Language,' a known standard for structuring data. XML is designed to provide flexible and adaptable information formatting and identification. XML is called extensible because it has no fixed format like HTML, the Hypertext Markup Language, which is a set of predefined markups. Instead, XML is actually a 'metalanguage'—a language for describing other languages—which allows users to design customized markup languages for many different types of documents. XML is not, however, a programming language as such; it is a markup standard for structuring data. In this disclosure, however, because XML has the effect of encoding or structuring computer data, preparation of XML documents and XSL specifications, although they may not be carried out by computer programmers as such, nevertheless are considered computer programming or software development.

Like HTML, XML makes use of elements, tags, and attributes. Elements are content segements identified by tags. Elements have possibly empty values, the value of an instance of an element being the string between the beginning and ending tags for the instance of the element. 'Tags' are words bracketed by '<' and '>,' and attributes are defined characteristics of elements having for example the form: AttributeName="value". While HTML specifies what each tag and attribute means, and often how the text between them will look in a browser, XML uses the tags only to delimit pieces of data, and leaves the interpretation of the data completely to the application that reads it. In other words, although in the predefined syntax of HTML, "<p>" means 'paragraph,' "<p>" in an XML file means whatever the reading application says it means. Depending on the context, it may be a price, a parameter, a person, or in many cases it represents an entity having nothing to do with Ps.

"XSL" refers to the 'Extensible Style Language,' a specification for separating style from content when creating HTML or XML pages. XSL specifications work much like templates, allowing users and designers to apply single style documents to multiple pages. XSL is the second style specification to be offered by the World Wide Web Consortium. The first, called Cascading Style Sheets, is similar to XSL but does not include two major XSL's innovations—allowing developers to dictate the way Web pages are printed, and, an innovation particularly useful in many embodiments of the present invention, specifications allowing users or developers to transfer XML documents across different applications. That is, XSL has the capability of specifying transformations of data structures expressed in XML.

"XSLT" refers to the Short for 'Extensible Style Language Transformation,' the language used in XSL style sheets to transform XML documents into other XML documents. An XSL processor reads the XML document and follows the instructions in the XSL style sheet; then it outputs a new XML document or XML-document fragment. This is particularly useful in various embodiments of the present invention, where the same data formats need to be converted into different structures represented in XML.

Application Integration

Figure 1A:
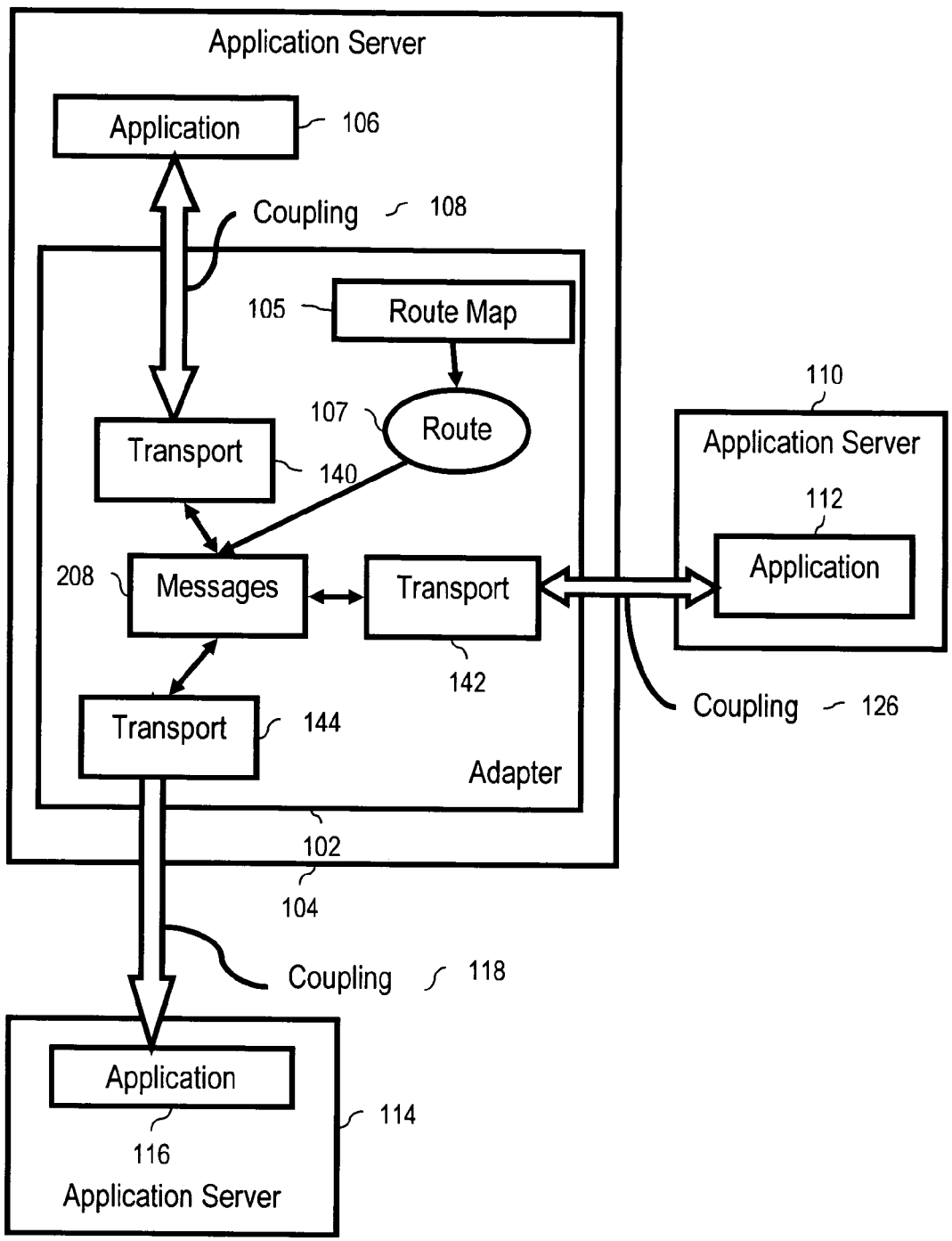
FIG. 1a shows a more detailed architectural example of an adapter providing integration for three applications.
Figure 1B:
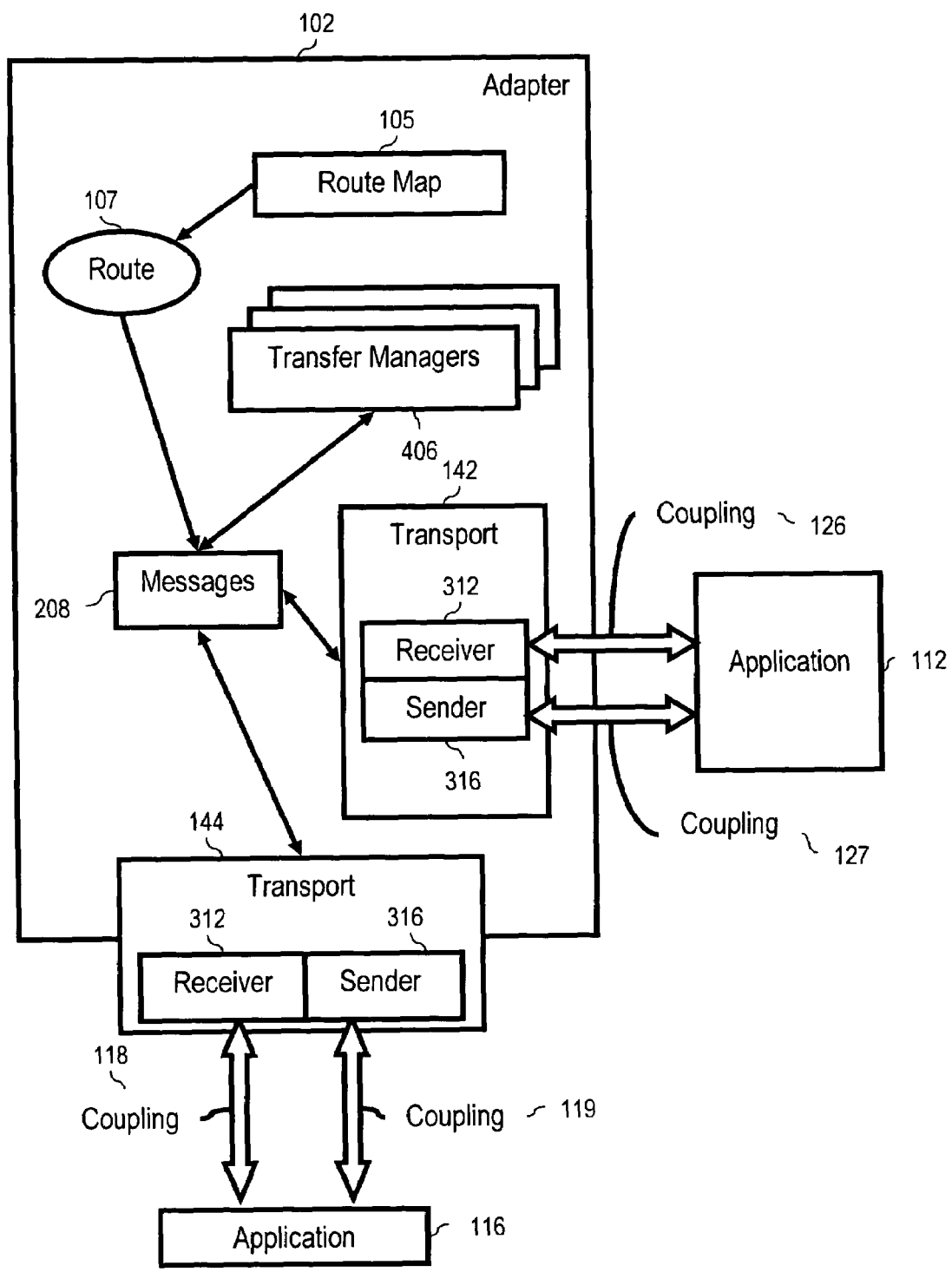
FIG. 1b shows a further architectural example of an adapter providing integration for applications.

Exemplary embodiments of the present invention provide application integration adapters capable of data transformation, data translation, and data communications in a variety of computer architectures. FIGS. 1, 1a, and 1b illustrate several architectural arrangements supported by, or useful with, application integration adapters ("adapters") according to various embodiments of the present invention. These figures also present certain architectural aspects of the adapters themselves according to various embodiments of the present invention.

FIG. 1 sets forth exemplary data communications architectures among adapters. According to one exemplary architecture of FIG. 1, an adapter (102) integrates functions of an application (106), inside a security firewall (128), with an application (116) on the other side of the same firewall (128). The adapter is coupled (118) for data communications across a WAN (126) to the application (116) outside the firewall (128). The adapter is coupled (106) for data communications to the application (116) inside the firewall (128), in fact installed on the same application server (104) with the adapter (102).

Couplings for data communications include any method, device, or protocol for data communications, optical, electrical, mechanical, or other. Couplings for data communications certainly include all data communications protocols and remote procedure protocols such as HTTP, CORBA, DCOM, IIOP, GIOP, RMI, SOAP, and so on.

Couplings for data communications include messaging to wireless pager clients identified by telephone numbers over the Simple Network Paging Protocol or 'SNPP,' version 3 of which is an enhanced, two-way protocol as defined in RFC1861. RFC1861 is an Internet protocol suite specification document promulgated by the Network Working Group in the Internet Engineering Task Force.

Couplings for data communications include messaging to wireless pager clients WCTP, the 'Wireless Communication Transfer Protocol.' WCTP is another two-way messaging protocol. WCTP is designed with the particular intention of using HTTP as its transport mechanism. WCTP is an open, non-proprietary industry standard promulgated by members of the PCIA, the Personal Communications Industry Association.

Couplings for data communication include messaging transmitted over HTTP through any of a number of proprietary instant messaging protocols, all of which have application programming interfaces ("APIs") available just for this purpose, that is, for use in messaging applications such as PVRs. Examples of such instant messaging protocols having APIs include those available from American On-line ("AOL"), Microsoft Network ("MSN"), Yahoo, Imici, Inc., and ICQ, Inc.

Couplings for data communications include transmitting messages as email through SMTP, POP, IMAP or other email protocols, between adapters and applications on any kind of device, personal computers, laptops, handhelds, cell phones, servers, and so on.

Couplings for data communications include the Small Message Service ("SMS") as supported by any telecommunications or telephone service. SMS provides a mechanism for transmitting short messages to and from wireless devices. SMS supports the transmission of short text messages from an adapter to an application a manner similar to alpha-numeric paging. SMS makes use of a Small Message Service Center or 'SMSC,' which acts as a store-and-forward system for short messages. In contrast to other existing text-message transmission services such as alpha-numeric paging, SMS is a reliable system, providing mechanisms to guarantee delivery of text messages to destinations. Additionally, SMS supports several input mechanisms that allow interconnection with different message sources and destinations. An adapter, or it sender or receiver, can, for example, function as a so-called 'External Short Message Entity,' or 'ESME,' and transmit SMS messages as HTTP forms or email messages. An adapter can function as a mobile originator, or 'MO,'that is, an SMS-enabled client device or, in effect, a cellular telephone. A distinguishing characteristic of SMS is that an SMS-enabled client is able to receive or submit a short message at any time, regardless whether a voice or data call is in progress.

Couplings for data communications include methods of data coupling other than data communications protocols as such, including, for example, shared memory segments, which could very well be the method utilized in an architecture in which an adapter (102) is installed on the same server (104) with an application (106) integrated by the adapter. A communications module within the application (106) and a communications module with the adapter (102), such as the receivers and senders discussed in more detail below in this disclosure, can be implemented as synchronized Java methods or C or C++ threads communicating messages through shared memory segments with mutual exclusion administered by use of semaphores.

As described above, couplings for data communications include wired network protocols as well as wireless network protocols and messaging systems. In addition, however, couplings for data communications include non-networked couplings as well, including wired serial couplings according to RS-232 (EIA232), IEEE 1394 (often called 'Firewire' connections, a trademark of Apple Computer, Inc.), hard-wired parallel port connections, and other direct, wired couplings as will occur to those of skill in the art.

According to a further exemplary architecture of FIG. 1, an adapter (136) on a client workstation (132) integrates functions of an application (134), installed on the same workstation, with an application (116) on a server coupled (136) for data communications through a LAN (130) to the workstation. The coupling for data communications (108) between the adapter (136) and the application (134), because the adapter (136) and the application (134) are on the same computer, can be implemented as local calls to software programs or modules on the work station, even through shared memory segments, or through other methods as will occur to those of skill in the art for programs or threads of execution on the same computer to communicate with one another. Although this particular architectural example is shown with a LAN (130) coupling between the server (114) and the workstation (132), readers by now will understand that the workstation can be a notebook computer and the coupling for data communications (136) can be an RS232 or USB connection direct through a wire between the server (114) and the workstation (132).

According to a further exemplary architecture of FIG. 1, an adapter (102) integrates functions of three applications (106, 112, 116). The adapter (102) is coupled (116) for data communications through a WAN (126) to one application (116). The adapter (102) is coupled (108) for data communications to another application (106) installed on the same server (104) with the adapter. And the adapter (102) is coupled (126) for data communications through a LAN (124) to a third application (112) on a second server (110) behind the same firewall (128) with the adapter (102). In such an architecture, if the application (116) were an inventory control program in a refinery, the application (106) was a general ledger on a server in a corporate headquarters, and the application (112) were a purchasing system in another building on the same corporate campus as the headquarters, then the purchasing system can transmit posting messages for inventory changes via HTTP to the adapter (102) which can forward them via a shared memory segment to the general ledger and via SOAP, IIOP, or RMI to the purchasing system. The purchasing system and the general ledger can respond with acknowledgment messages to the inventory control program. The purchasing system can transmit posting messages for new purchases to the general ledger only, without copying the inventory control system. And the general ledger can send acknowledgements to the purchasing system only, without copying the inventory control program. All three applications can utilize completely different data structures in their messages, developed with no coordination by three different software development companies.

FIG. 1a shows a more detailed architectural example of an adapter (102) providing integration for three applications (106, 112, 116). The example of FIG. 1a includes three software modules (140, 142, 144) called 'transports,'used in many adapters according to embodiments of the present invention to carry out data communications and message format translation. The exemplary adapter of FIG. 1a includes a map (105), a data structure mapping message routes among the transports. That is, many adapters according to embodiments of the present invention route messages among transports, and therefore among applications, in dependence upon route maps.

Continuing with the example of the inventory control program, the general ledger, and the purchasing system, the adapter (102) of FIG. 1a, by use of the route map (105) can know that:

posting messages from the purchasing system are routed only to the general ledger and not to the inventory control program;

purchase posting acknowledgment messages from the general ledger are routed only to the purchasing system, not to the inventory control program;

posting messages from the inventory control program are routed to both the general ledger and to the purchasing system;

inventory posting acknowledgment messages from the general ledger are routed only to the inventory control program; and inventory posting acknowledgement messages from the purchasing system are routed only to the inventory control program.

A simple adapter, having only two transports and integrating only two applications, may advantageously operate without a route map, routing all messages from either application to the other application, regardless of message type. The example of FIG. 1a illustrates the usefulness of a route map in an adapter, however, with, in this example, the route map keyed by message type, source, and destination. The example of FIG. 1a illustrates only three applications integrated with only three adapters, and this disclosure discussed only a few messages types. The usefulness of route maps is clear then in light of the fact that in adapters according to embodiments of the present invention there is no limitation regarding the number of transports in an adapter or the number of applications that can usefully be integrated.

FIG. 1b shows a further architectural example of an adapter (102) providing integration for applications (112, 116). In the example of FIG. 1b, the transports (142, 144) include additional software modules, called 'receivers' (312) and 'senders' (316), that are used in many adapters according to embodiments of the present invention to carry out data communications between adapters and software applications. In embodiments of the kind exemplified in FIG. 1b, the receivers and senders each administers its own coupling for data communications (118, 119, 126, 127). In addition, there is no limitation of the present invention regarding the types of couplings. That is, in a particular exemplary adapter according to an embodiment of the present invention, a receiver (312) in a transport (142) can implement its coupling for data communications with an application in the form of message traffic according to SOAP, while the sender (316) in the same transport (142) sends its message traffic in the form of plain HTTP 'post' messages.

Figure 2:
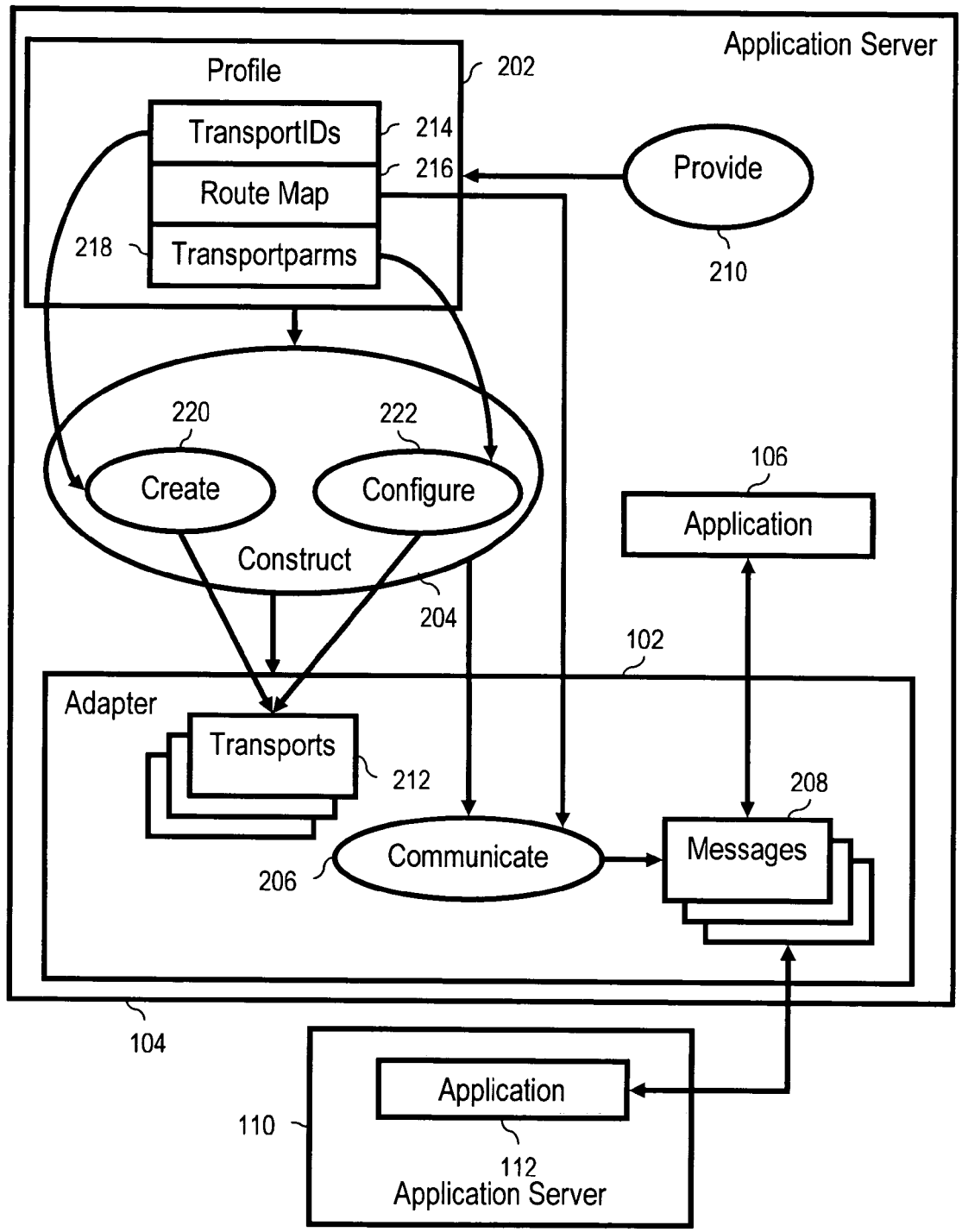
FIG. 2 sets forth a data flow diagram illustrating a method of application integration utilizing application integration adapters.

FIG. 2 sets forth a data flow diagram illustrating a method of application integration utilizing application integration adapters. In particular, the method of FIG. 2 includes constructing (204) an application integration adapter, where the constructing is carried out in dependence upon a profile (202) comprising data describing the adapter. The method of FIG. 2 also includes providing (210) an adapter profile comprising identifications (214) of at least two communications transports, including configuration parameters (218)

for the data communications transports. In many embodiments of adapters according to the present invention, providing (210) a profile is carried out by a user's or developer's typing into a text file designated for use as a profile, through a word processor or text editor, a representation of a data structure describing components of an adapter. The representation can be any encoding of data structure, including, for example, XML. In fact, this disclosure discusses profiles mainly in terms of XML, although discussing profiles in terms of XML is for convenience of explanation, not for limitation of the invention. Profiles can be encoded with any representation of data structure, C, C++, Java, SGML (the Standard Generalized Markup Language), and others as will occur to those of skill in the art.

The method of FIG. 2 also includes communicating (206) integration messages (208) among applications (105, 112) through the adapter (102). In many embodiments of the method of FIG. 2, providing (210) an adapter profile further comprises providing an adapter profile comprising a route map (216) of data routes among the transports (212) within the adapter, and communicating (206) integration messages among applications is carried out in dependence upon the route map (216). In the method according to FIG. 2, constructing (214) an integration adapter also includes creating (220) the transports (212) identified in the adapter profile (202) and configuring (222) the transports (212) in accordance with the configuration parameters (218).

A profile is a data structure that represents an adapter structure and has data elements that identify and describe the adapter's components. An adapter according to embodiments of the present invention uses the profile to effectively construct itself according to the descriptions of its components set forth in the profile. Because profiles are data structures, profiles can be implemented in anyway that any data structure can be implemented, in any programming language, in any kind of encoding, in any kind of file format or database record structure. This disclosure represents profiles in XML, not as a limitation, but because XML is conveniently comprehensible to human readers where many implementations of profiles, for example in binary machine-readable formats would not be so convenient for use in explanation. Also in this disclosure, examples tend to be presented in object oriented terms, in terms of Java and C++ in particular. But once again, there is within the present invention no limitation to any particular programming paradigm or to any particular programming language or languages. With these cautionary notes in view, here is an XML example of a profile:

```
<adapter>
    <transportmodules>
        <transport class="InventoryControl.java" id="inventoryControl">
            <receiver>
                <configParm>parmValue</configParm>
            </receiver>
            <sender>
                <configParm>parmValue</configParm>
            </sender>
        </transport>
        <transport class="GeneralLedger.java" id="generalLedger">
            <receiver>
                <configParm>parmValue</configParm>
            </receiver>
            <sender>
                <configParm>parmValue</configParm>
            </sender>
        </transport>
    </transportmodules>
```

-continued

```
    <transfermodules>
        <transferManager class="xfrMgr1.java" order="1">
            <configParm>parmValue</configParm>
        </transferManager>
        <transferManager class="xfrMgr2.java" order="2">
            <configParm>parmValue</configParm>
        </transferManager>
        <transferManager class="xfrMgr2.java" order="3">
            <configParm>parmValue</configParm>
        </transferManager>
    </transfermodules>
</adapter>
```

This exemplary XML profile identifies two transports, one named 'inventoryControl' and one named 'generalLedger.' Each transport has a receiver and a sender. Each receiver and sender has a configuration parameter. Many implementations of profiles will identify and define more than two transports, and many implementations of senders and receivers will have more than one configuration parameter. The numbers in this example are picked for clarity and brevity of explanation, not for limitation.

In the case of senders and receivers for dial-up telephone communications protocols, for example, configuration parameters can include telephone numbers, modems speeds, login identification codes, passwords, and so on. In the case of senders and receivers for the HTTP communication protocol, configuration parameters include one or more URIs. In the case of senders and receivers implementing data communications with JMS, for example, configuration parameters can include identifications of JMS queues, queue connections, queue senders, queue connection factory objects or factory methods, naming directory contexts, and so on. In the case of senders and receivers implementing data communications over plain TCP/IP, configuration parameters include internet protocol addresses and port numbers. For senders and receivers implementing data communications through flat files in file systems, configuration parameters include path names and filenames.

The example XML profile identifies and provides configuration parameters for three transfer managers. A transfer manager is essentially self-contained program code that is allowed to manipulate message received or sent by an adapter. Transfer managers allow for arbitrary processing on messages to support advanced routing, translation, security, logging, or any other function of message processing as will occur to those of skill in the art. The transfer managers and the order in which they are run are defined in the adapter profile. Adapters according to this invention typically support an arbitrary number of transfer managers. There are no processing limitations applied to transfer managers. Any transfer manager is free to manipulate message content of any message passed to it in any way, including manipulation of the message body and any header parameters.

More particularly, this example XML profile identifies and provides configuration parameters for three transfer managers but contains no express route map. An adapter built in dependence upon this example profile routes all messages received in the inventoryControl transport to all transfer managers and then to the sender in the generalLedger transport. In such an adapter, all messages received in the generalLedger transport are routed to all transfer managers and then to the sender in the inventoryControl transport. The 'class' attribute in the <transferManager> tags identifies a Java class from which each transfer manager can be instantiated. The 'order' attribute in the <transferManager> tags identifies the order in which message events are to be passed to the transfer managers, so that the transfer managers can be designed and programmed to depend on one another or not to interfere with one another, as needed.

Not all transfer managers will process all messages, despite the fact that in this particular model, all messages are passed to all transfer managers. That is, a transfer manager programmed to transform the data structure of an accounting entry in a posting message will perform no processing whatsoever on an ACK, an acknowledgment message. In this model, it is part of the programming of the transfer managers themselves to infer from the parameters in message events which messages are to be processed by a particular transfer manager. Given a message event object similar to that illustrated for example at reference (602) in FIG. 5*h*, a transfer manager is programmed to infer from a destinationID code (604), possibly combined with a sourceID code (606) or a messageType code (607), that, for example, a posting message traveling from an inventory control program to a general ledger is a message to be processed or ignored by the particular transfer manager. If the routing structure is simple and only one type of message travels to a particular destination, the destinationId (604) alone may be sufficient. If routing alternatives in a particular adapter are complex and many message types travel to the same destination, a transfer manager may need more information to determine whether a particular message is its to process.

Route maps in profiles are aids in addressing such complexity. Consider, for example, the following exemplary XML profile:

```
<adapter>
  <transportmodules>
    <transport class="InventoryControl.java" id="inventoryControl">
      <receiver>
           <configParm>parmValue</configParm>
      </receiver>
      <sender>
           <configParm>parmValue</configParm>
      </sender>
    </transport>
    <transport class="GeneralLedger.java" id="generalLedger">
      <receiver>
           <configParm>parmValue</configParm>
      </receiver>
      <sender>
           <configParm>parmValue</configParm>
      </sender>
    </transport>
    <transport class="Purchasing.java" id="purchasingSystem">
      <receiver>
           <configParm>parmValue</configParm>
      </receiver>
      <sender>
           <configParm>parmValue</configParm>
      </sender>
    </transport>
  </transportmodules>
  <transfermodules>
    <transferManager class="xfrMgr1.java" mapID="route1" order="1">
        <configParm>parmValue</configParm>
    </transferManager>
    <transferManager class="xfrMgr2.java" mapID="route3" order="2">
        <configParm>parmValue</configParm>
    </transferManager>
    <transferManager class="xfrMgr3.java" mapID="route3" order="3">
        <configParm>parmValue</configParm>
    </transferManager>
    <transferManager class="xfrMgr4.java" mapID="route2, route4,
           route5" order="4">
        <configParm>parmValue</configParm>
```

-continued

```
    </transferManager>
  </transfermodules>
  <routemaps>
    <map id="route1">
      <msgType>post</msgType>
      <from>purchasingSystem</from>
      <to>generalLedger</to>
    </map>
    <map id="route2">
      <msgType>ACK</msgType>
      <from>generalLedger</from>
      <to>purchasingSystem</to>
    </map>
    <map id="route3">
      <msgType>post</msgType>
      <from>inventoryControl</from>
      <to>generalLedger</to>
      <to>purchasingSystem</to>
    </map>
    <map id="route4">
      <msgType>ACK</msgType>
      <from>generalLedger</from>
      <to>inventoryControl</to>
    </map>
    <map id="route5">
      <msgType>ACK</msgType>
      <from>purchasingSystem</from>
      <to>inventoryControl</to>
    </map>
  </routemaps>
</adapter>
```

This exemplary XML profile identifies and describes three transports named respectively "inventoryControl", "generalLedger", and "purchasingSystem". The exemplary XML profile describes four transfer managers identified by unique order numbers 1, 2, 3, and 4. The transfer manager elements now have a new attribute, 'mapID,' in the <transferManager> tag to tie the transfer managers to route maps. 'mapID' takes as its value a route map identification code.

This exemplary XML profile also describes five route maps identified by unique identification codes "route1", "route2", "route3", "route4", and "route5". Route map "route1" describes a message route for messages of type 'post' from a purchasing system to a general ledger. Route map "route2" defines a message route for acknowledgement messages from the general ledger to the purchasing system. Route map "route3" defines a message route for posting messages from the inventory control program to both the general ledger and to the purchasing system. Route map "route4" defines a message route for inventory posting acknowledgment messages from the general ledger to the inventory control program. Route map "route5" defines a message route for inventory posting acknowledgement messages from the purchasing system to the inventory control program.

An exemplary adapter built in dependence upon a profile like this XML example routes posting messages from the purchasing system to the general ledger through only on of the transfer managers, the one identified by the attribute 'order=1.' In this example, it is the adapter that must examine the message event parameters such as destinationID, sourceID, messageType, and so on, to determine which route to use and therefore which transfer manager will process which messages. That is, in this example, only one message type is routed to the transfer manager having <transferManager> attribute 'order=1,' thereby eliminating any need for the transfer manager to analyze whether it is to process the messages it receives: It simply processes all messages it receives.

Similarly in this example, all acknowledgment messages or 'ACKs' are routed to the transfer manager with <transferManager> attribute 'order=4.' In some exemplary embodiments of such a transfer manager, the transfer manager will process all ACK messages in a similar fashion. To the extent that ACK message processing differs according to destination or source, then it is to the transfer manager to make that determination by reference to the destinationID (604 on FIG. 5*h*) or the sourceID (606) in each message event passed to it. Still in this example, the determination whether to process a message is removed from the transfer manager and placed in the programming of the adapter itself in dependence upon a route map from its profile.

The processing of posting messages from the inventory control program to both the general ledger and to the purchasing system is also instructive in this example XML profile. Route map "route3" defines a message route from the inventory control program to both the general ledger and to the purchasing system. Two transfer managers are described in the profile as being on "route3," the transfer manager having <transferManager> attribute 'order=2' and the transfer manager having <transferManager> attribute 'order=3.' In this example, both the general ledger and the purchasing system are from different software developers and use completely different data structures for account postings. Assume that the transfer manager having <transferManager> attribute 'order=2' transforms the data structure of an incoming message from the inventory control structure to the general ledger structure and that the transfer manager having <transferManager> attribute 'order=3' transforms the data structure of an incoming message from the inventory control structure to the purchasing system structure. The adapter in this example makes a copy of the incoming posting message event from the inventory control transport, sends the original to the transfer manager having <transferManager> attribute 'order=2' and the copy to the transfer manager having <transferManager> attribute 'order=3.' On return of the call to the transfer manager having <transferManager> attribute 'order=2,' the adapter forwards the original message event, now structured for use in the general ledger, to the sender in the transport for the general ledger. On return of the call to the transfer manager having <transferManager> attribute 'order=3,' the adapter forwards the copy of the message event, now structured for use in the purchasing system, to the sender in the transport for the purchasing system. In all cases in this example, the transfer manager receiving a message simply processes the message without deciding whether to do so. The processing burden of deciding which transfer manager is to process which message is effectively shifted to the adapter object itself in dependence upon destination, source, and type information in the message event itself (references 604, 606, 607, for example, on FIG. 5*h*).

In some embodiments, a transfer manager is called on more than one route through an adapter. Rather than effect multiple routings by use of multiple entries of transfer managers in a transfer modules element (speaking in terms of our XML example), in alternative exemplary embodiments it is advantageous to list the transfer mangers directly in the route map descriptions, as illustrated by the following example:

```
<adapter>
  <transportmodules>
    <transport class="InventoryControl.java" id="inventoryControl">
      <receiver>
        <configParm>parmValue</configParm>
      </receiver>
```

-continued

```
      <sender>
        <configParm>parmValue</configParm>
      </sender>
    </transport>
    <transport class="GeneralLedger.java" id="generalLedger">
      <receiver>
        <configParm>parmValue</configParm>
      </receiver>
      <sender>
        <configParm>parmValue</configParm>
      </sender>
    </transport>
    <transport class="Purchasing.java" id="purchasingSystem">
      <receiver>
        <configParm>parmValue</configParm>
      </receiver>
      <sender>
        <configParm>parmValue</configParm>
      </sender>
    </transport>
  </transportmodules>
  <transfermodules>
    <transferManager class="xfrMgr1.java" id="xfrMgrName1" order="1">
      <configParm>parmValue</configParm>
    </transferManager>
    <transferManager class="xfrMgr2.java" id="xfrMgrName2" order="2">
      <configParm>parmValue</configParm>
    </transferManager>
    <transferManager class="xfrMgr3.java" id="xfrMgrName3" order="3">
      <configParm>parmValue</configParm>
    </transferManager>
    <transferManager class="xfrMgr4.java" id="xfrMgrName4" order="4">
      <configParm>parmValue</configParm>
    </transferManager>
  </transfermodules>
  <routemaps>
    <map id="route1">
      <msgType>post</msgType>
      <from>purchasingSystem</from>
      <to>generalLedger</to>
      <transferManager>xfrMgrName1</transferManager>
    </map>
    <map id="route2">
      <msgType>ACK</msgType>
      <from>generalLedger</from>
      <to>purchasingSystem</to>
      <transferManager> xfrMgrName4</transferManager>
    </map>
    <map id="route3">
      <msgType>post</msgType>
      <from>inventoryControl</from>
      <to>generalLedger</to>
      <to>purchasingSystem</to>
      <transferManager> xfrMgrName2</transferManager>
      <transferManager> xfrMgrName3</transferManager>
    </map>
    <map id="route4">
      <msgType>ACK</msgType>
      <from>generalLedger</from>
      <to>inventoryControl</to>
      <transferManager> xfrMgrName4</transferManager>
    </map>
    <map id="route5">
      <msgType>ACK</msgType>
      <from>purchasingSystem</from>
      <to>inventoryControl</to>
      <transferManager> xfrMgrName4</transferManager>
    </map>
  </routemaps>
</adapter>
```

This example profile implements the exact same routes among senders and receivers as the earlier example profile. That is, route map "route1" describes a message route for messages of type 'post' from a purchasing system to a general ledger, including routing through the first listed transfer manager, here identified with its identification name "xfrMgr1." Route map "route2" defines a message route for acknowledgement messages from the general ledger to the purchasing system, including routing through the second listed transfer manager, here identified with its identification name "xfrMgr2." And so on for the remaining three route maps. Unlike the first example, however, in this example the route identifiers in the transfer managers, mapID="route 1", mapID="route2", and so on, are removed, and the transfer managers are associated with map routes by placing the names of the transfer managers directly in the map definitions as <transferManager> xfrMgrName1</transferManager>, <transferManager>xfrMgrName2 </transferManager>, and so on. The fourth transfer manager, the one named "xfrMgr4," is called on three routes through the adapter, the three identified as "route2," "route4," and "route5."

Figure 5:
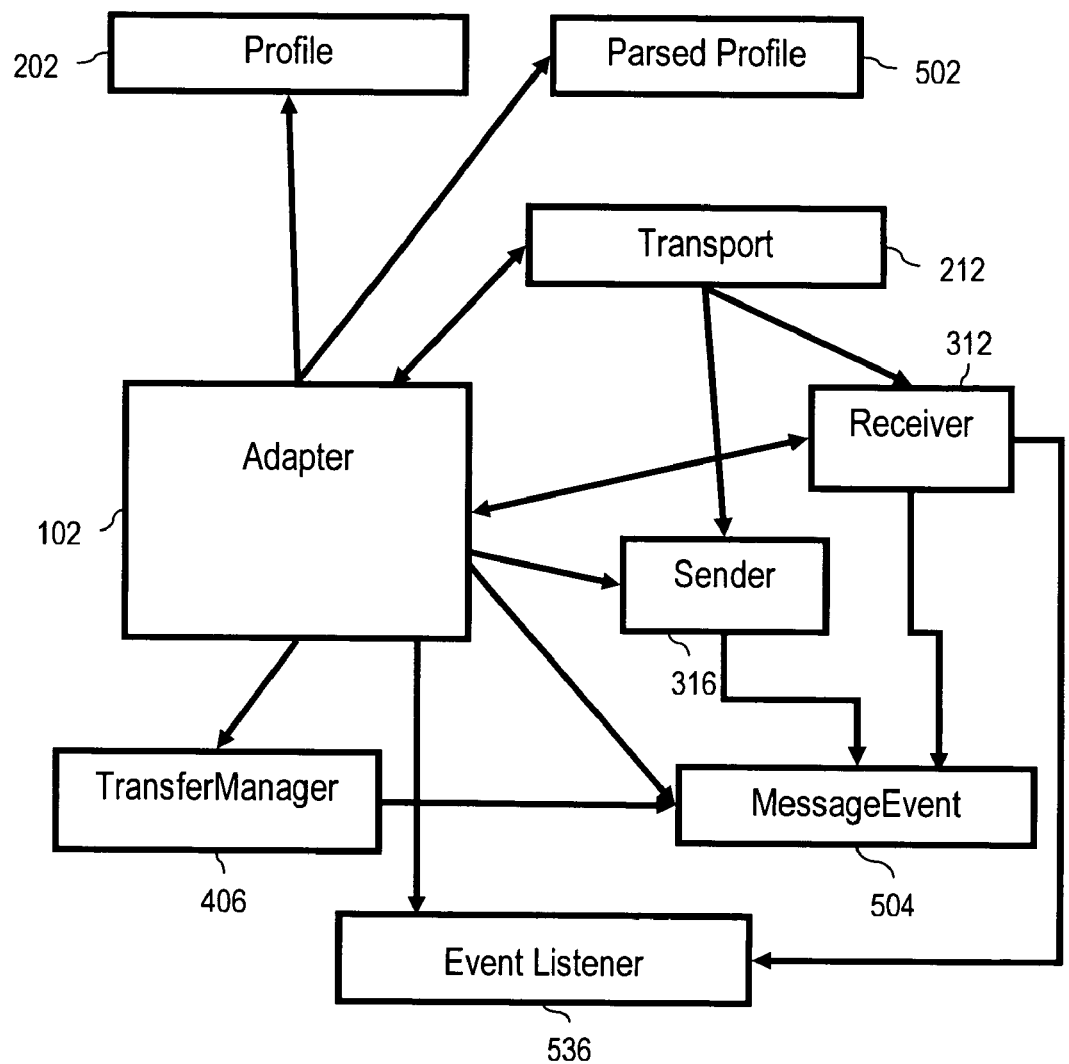
FIG. 5 illustrates relations among exemplary classes from which adapters are constructed according to embodiments of the present invention.
Figure 5A:
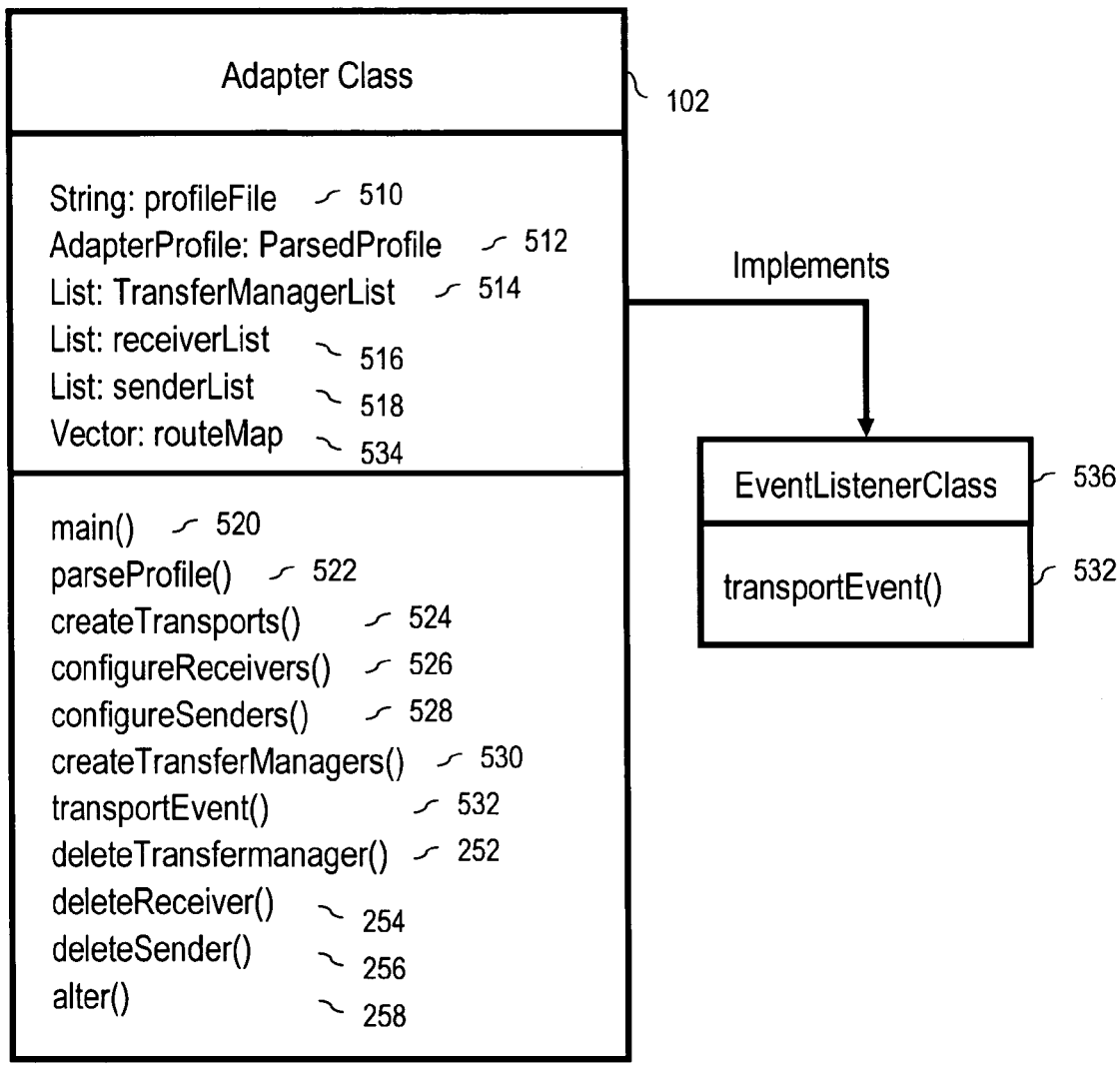
FIGS. 5a–5h illustrate examples of class structures useful in various exemplary embodiments of the present invention.
Figure 5B:
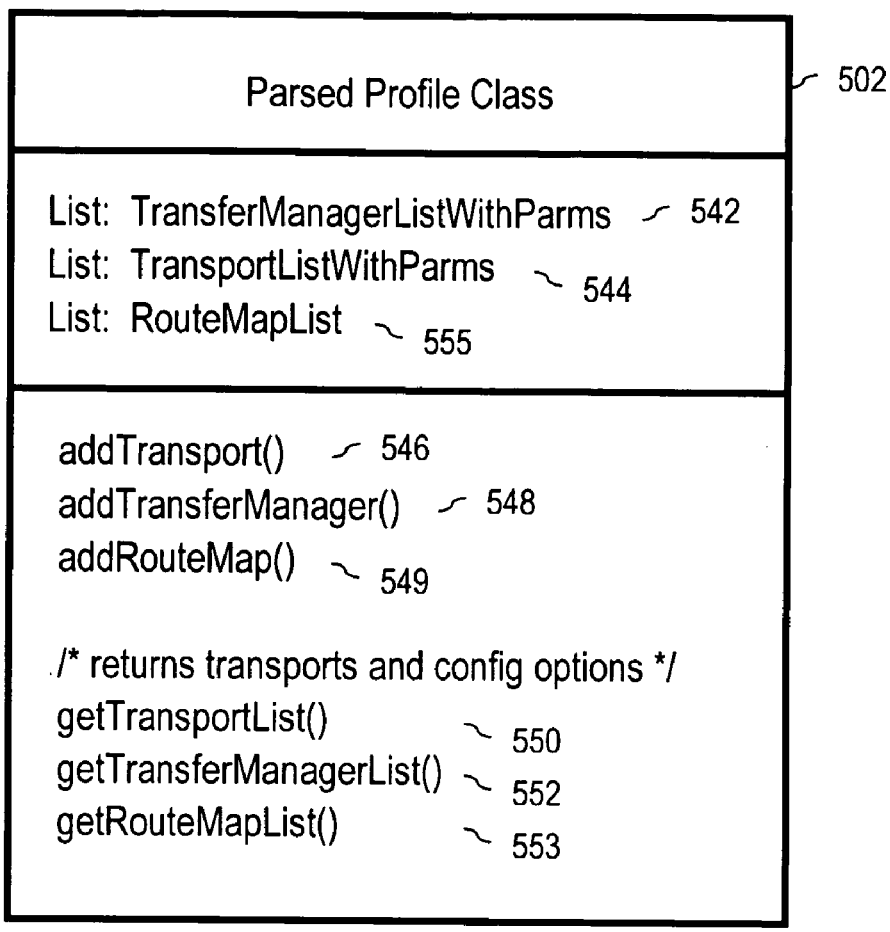
Figure 5C:
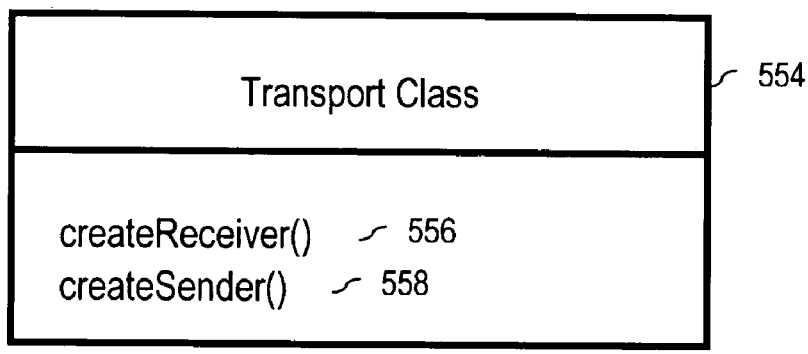
Figure 5D:
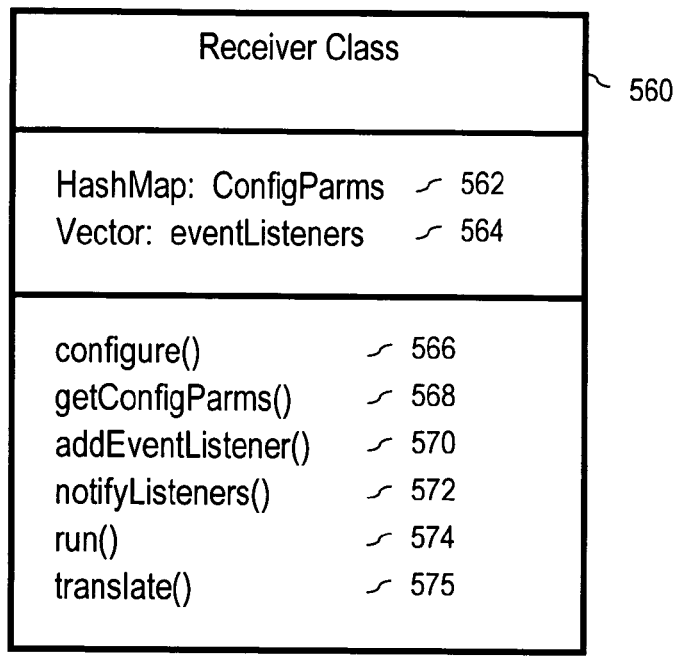
Figure 5E:
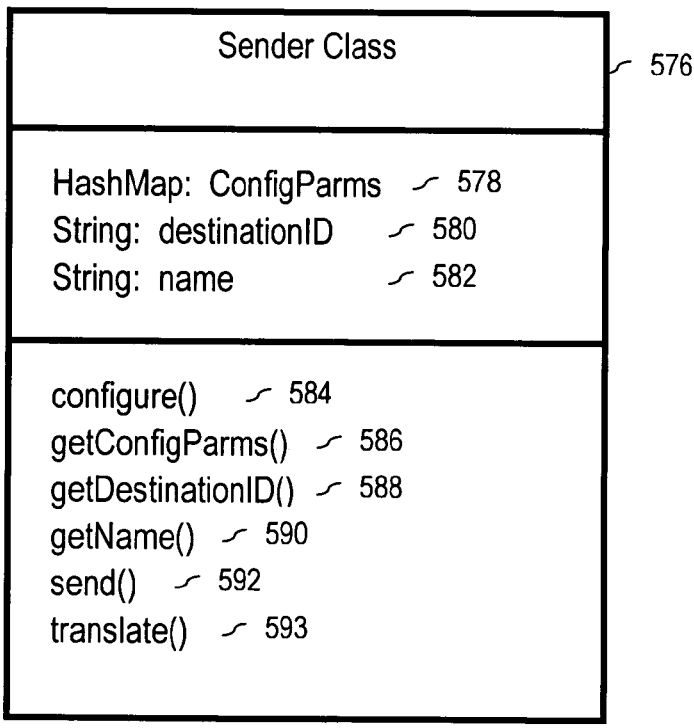
Figure 5F:
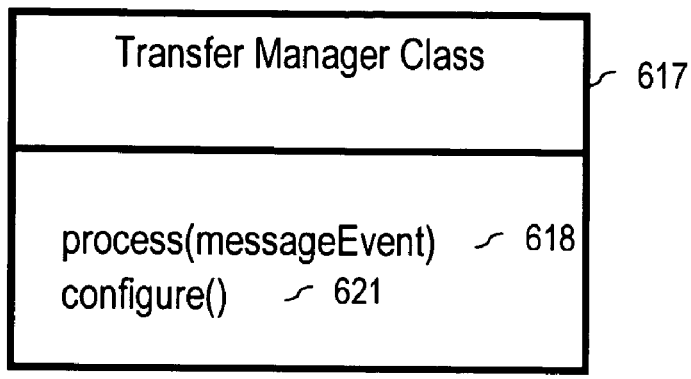
Figure 5G:
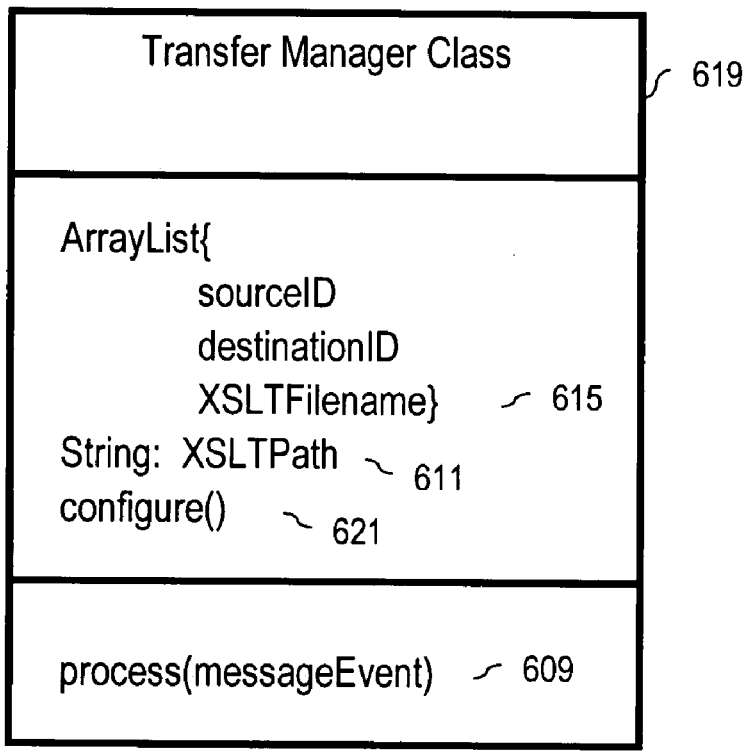
Figure 5H:
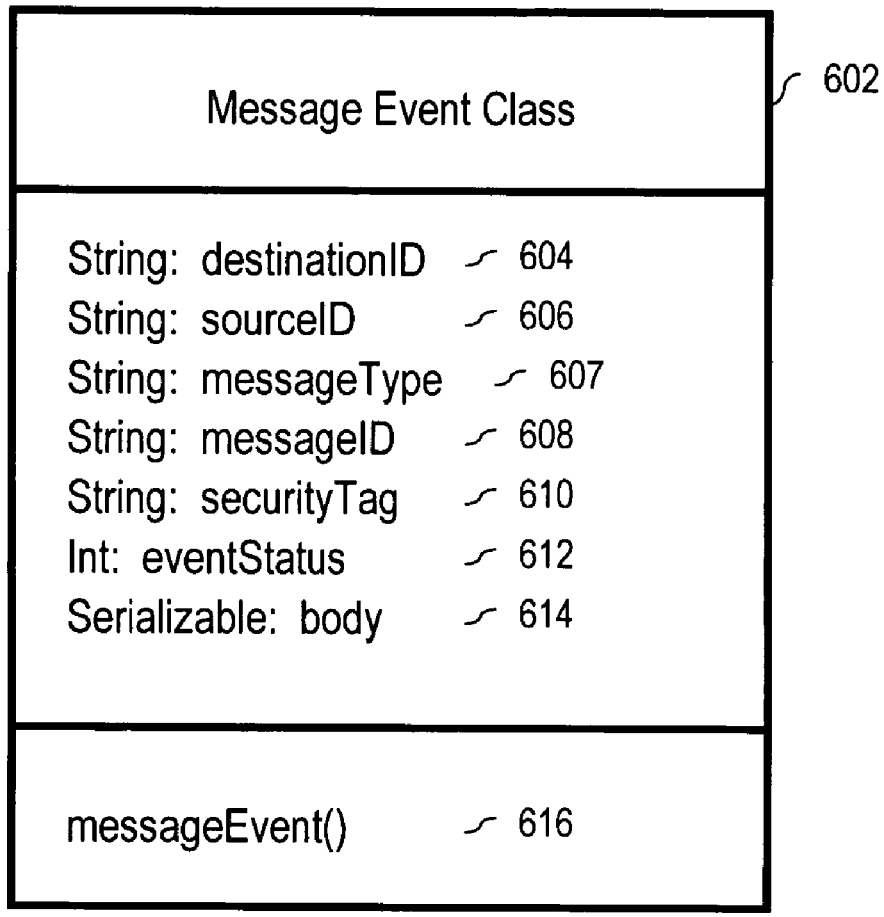

Creating (220) the transports (212) identified in the adapter profile (202) and configuring (222) the transports (212) in accordance with the configuration parameters (218) are carried out in many adapters according to embodiments of the present invention as illustrated by the exemplary class structures set forth in FIGS. 5 and 5a–5h. FIG. 5 illustrates relations among exemplary classes from which adapters are constructed according to embodiments of the present invention.

Often in this disclosure, software modules are described as 'comprising' other software modules, as when an adapter is described of as 'comprising' or 'including' a transport, a sender, a receiver, or a transfer manager. It is useful to note that in the object oriented paradigm used most often in this disclosure to describe various exemplary embodiments of the invention, that one module comprises or includes another usually means that the first module possesses a reference or a pointer to the second module, as in a transport 'has a' receiver, meaning that the transport holds in its member data elements a reference to the receiver object. In C++ it might be more common to administer references as pointers to objects, but for brevity and clarity in this disclosure, such relationships are usually described in terms of references. The arrows in FIG. 5 generally indicate the object-oriented 'has-a' relationship, that is, which class will typically possess references to other classes.

An adapter (102) according to the example of FIG. 5 has a reference to a profile (202), although as a practical matter, the profile (202) often will not be a class object at all, but will be a file in a file system instead. Administration of data in a file system is much slower than in computer memory, of course, so that most adapters (102) according to embodiments of the present invention therefore parse the profile (102) into an internal class object more convenient for reference within a running software system, here illustrated as a parsed profile class (502). The adapter (102) instantiates the transports (212) and the transfer managers (406) identified in the profile (202). In this example, the transport (212) instantiates the receiver (312) and the sender (316) and returns references to them to the adapter so that the adapter also possesses references to the receiver class (312) and the sender class (316). The adapter uses its reference to the receiver to register an event listener (536) with the receiver (312). The event listener (536) is shown in FIG. 5 as a separate class, but as a practical matter many adapters will register the adapter itself as an event listener. When a receiver (312) receives a message, the receiver encapsulates the message in a message event (504) and passes a reference to the message event back through the event listener to the adapter (102), or directly to the adapter if the adapter is the event listener. The adapter passes the message event object, or actually the reference to the message event object, to the transfer managers (406) and then to the sender (504) to process the message and then send it on to its destination. Hence the transfer manager class (406), the receiver (312), the sender (316), and the adapter (102) all gain references to the message event class (504).

Again with reference to FIG. 2 and in terms of the class diagrams of FIGS. 5 and 5a–5h, constructing (204) an application integration adapter, where the constructing is carried out in dependence upon a profile (202) comprising data describing the adapter, is, in many exemplary embodiments of the present invention, initiated by a command line interface entry having a form similar to the following example:

Java com.adapters.Adapter<ProfileName>

This example command instructs a Java Virtual Machine to load and instantiate an adapter named "Adapter" and run its main( ) member method (reference 520 on FIG. 5a). In this disclosure, descriptions of actions or processing steps carried out by adapter objects are, unless context requires otherwise, generally descriptions of the operation of a main( ) member method in an adapter object of the kind illustrated at reference (102) on FIG. 5a. In this example, main( ), or the adapter rather, optionally, but typically, proceeds by opening a profile in a file named "ProfileName" and parsing it into internal memory in a data structure similar to the one illustrated at reference (502) on FIG. 5b. The parsed profile class of FIG. 5b provides parsed storage for a list of transfer managers (542), a list of transports including their configuration parameters (544), and a list of route maps (555). In addition to the structured memory provided by the lists, the parsed profile class of FIG. 5b also provides member methods for adding to the lists (546, 544, 555) and member methods for retrieving the lists (550, 552, 553) when they are needed by other cooperating objects.

The list of transfer managers (542), the list of transports including their configuration parameters (544), and the list of route maps (555) are all described in FIG. 5b as having the datatype 'List'. This description of datatype is not limiting. A variety of datatype can be used for such data structures, and for all data structures discussed in this disclosure, as will occur to those of skill in the art, including, for example, vectors, arraylists, sets, containers, and so on.

In the method according to FIG. 2, constructing (214) an integration adapter also includes creating (220) the transports (212) identified in the adapter profile (202) and configuring (222) the transports (212) in accordance with the configuration parameters (218). In this example, Adapter.main( ) creates transports by instantiating each transport listed in the transport list (544) in the parsed profile (502). Configuring (222) the transports (212) in accordance with the configuration parameters (218) typically comprises creating the receivers and senders for each transport and configuring the receivers and senders with the configuration parameters.

Figure 3:
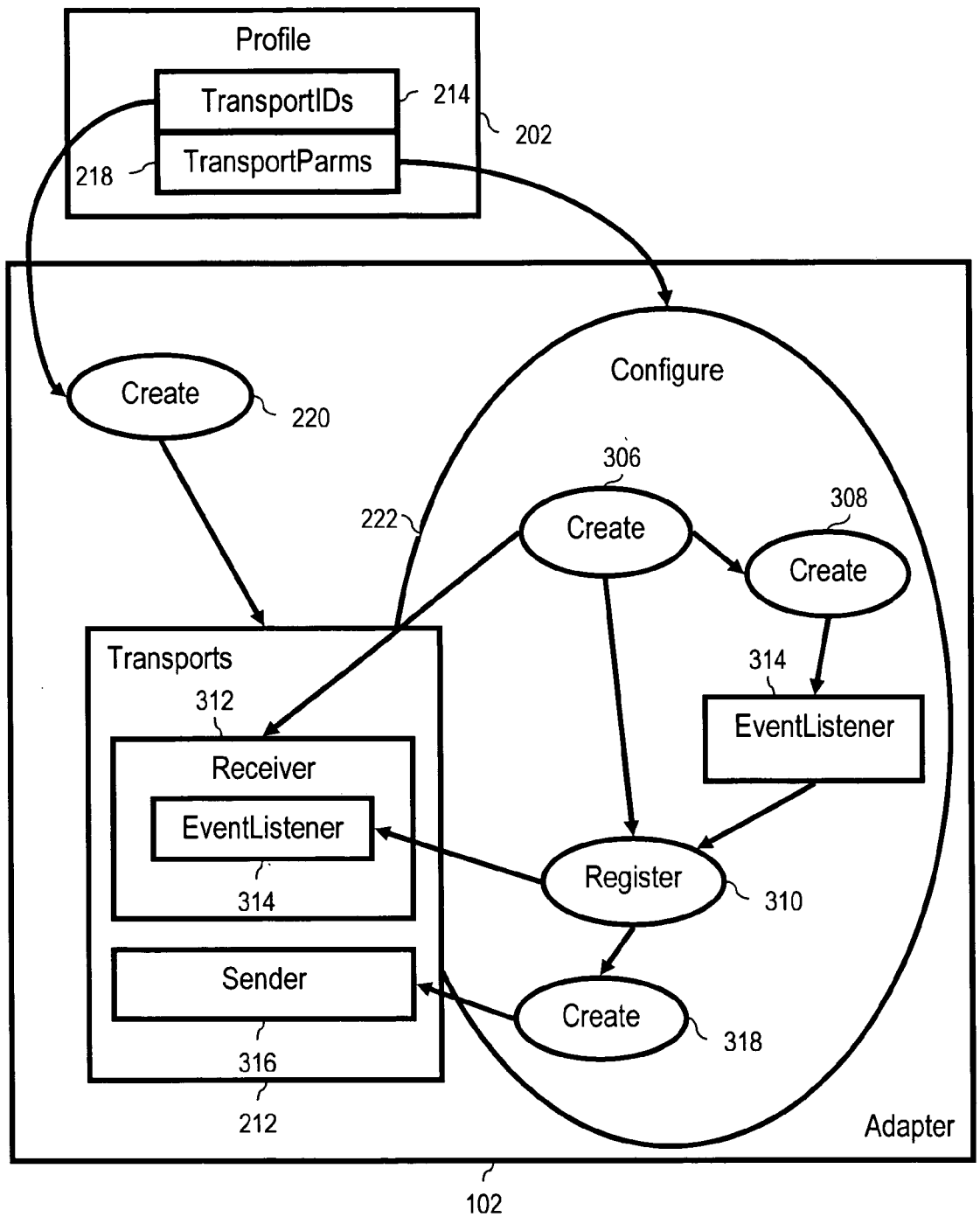
FIG. 3 sets forth a data flow diagram illustrating a method of creating receivers and senders for transports for application integration adapters according to the present invention.

FIG. 3 sets forth a data flow diagram illustrating a method of creating receivers and senders for transports for application integration adapters according to the present invention. In many adapters implemented according to the method of FIG. 3, each transport comprises a parameterized factory method (556 on FIG. 5c) for creating a receiver. In such embodiments, configuring (222) the transports includes creating (306) a receiver for each transport, carried out by a call to the parameterized factory method (556 on FIG. 5c) for creating a receiver with at least some of the configuration parameters. In the method according to FIG. 3, each transport typically includes a factory method for creating a sender (558 on FIG. 5c), and configuring (222) the transports (212) also includes creating (318) a sender (316) for each transport (212).

Here is an explanatory pseudocode example of a factory method:

```
//
// Transport Class
//
// Illustrating a parameterized factory method for creating receiver objects
//
class TransportClass
{
  public static Receiver createReceiver(ConfigParm1, ConfigParm2, and
  so on ...)
  {
    if(ConfigParm1==HTTP && ConfigParm2==
    INVENTORYCONTROL)
      receiverID = "receiver1";
    else if(ConfigParm1==IIOP && ConfigParm2==
    INVENTORYCONTROL)
      receiverID = "receiver2";
    else if(ConfigParm1==HTTP && ConfigParm2==
    GENERALLEDGER)
      receiverID = "receiver3";
    else if(ConfigParm1==JMS && ConfigParm2==GENERALLEDGER)
      receiverID = "receiver4";
    else if(ConfigParm1==HTTP && ConfigParm2==
    PURCHASINGSYSTEM)
      receiverID = "receiver5";
    else if(ConfigParm1==IIOP && ConfigParm2==
    PURCHASINGSYSTEM)
      receiverID = "receiver6";
    Receiver aReceiver = null; // empty reference for new receiver object
    switch(receiverID)
    {
      case "receiver1": aReceiver = new receiver1.class; break;
      case "receiver2": aReceiver = new receiver2.class; break;
      ... ... ...
      case "receiverN-1": aReceiver = new receiver5.class; break;
      case "receiverN": aReceiver = new receiver6.class; break;
    } // end switch( )
    return aReceiver;
  } // end createReceiver( )
  public static Sender createSender(ConfigParm1, ConfigParm2, and
  so on ... )
  {
    // Exemplary Transport classes also support factory methods for
    senders
    // similar to the one for receivers set forth just above,
    createReceiver( ).
  }
} // end class TransportClass
```

In this pseudocode example, createReceiver( ) is a parameterized factory method. CreateReceiver( ) is called by, for example, Adapter.main( ) with a set of configuration parameter as parameters for the call. CreateReceiver( ) can be overloaded and called with any combination of configuration parameters supported by any receiver class supported in the factory method createReceiver( ). CreateReceiver( ) can support any number of concrete receiver classes. CreateReceiver( ) functions by selecting a receiver identification through a series of IF statements based upon the configuration parameters. CreateReceiver( ) then operates a switch( ) statement in dependence upon the receiver identification to select a concrete receiver class and instantiate from it a new receiver object.

In this example, the class named "Receiver" is an abstract class from which all the other receiver classes inherit, thereby enabling createReceiver( ) to returns a reference of type 'Receiver' that can in fact be a reference to any receiver class object. Calls to receiver objects from cooperating objects in an adapter can therefore be polymorphic. In this way, neither the transport, the adapter itself, nor any cooperating object or software module comprised within the adapter knows or cares which applications are being integrated nor which communications protocols are used to integrate them. All cooperation among objects within the adapter is rendered completely neutral, transparent, and modular with respect to application identities and communications protocols.

The method illustrated in FIG. 3 includes registering (310) a transport event listener with each receiver. In some adapters that create receivers according to the method of FIG. 3, the integration adapter (102) itself comprises a transport event listener (314). That is, in some embodiments, registering (310) a transport event listener with each receiver, is carried out by registering the adapter itself as an event listener. In such embodiments, the adapter itself will contain a member method for the receiver to call to hand off an incoming message, such as, for example, the transportEvent( ) method shown at reference (532) in the exemplary adapter class (102) on FIG. 5a. In embodiments in which the event listener (314) is a separate object from the adapter itself, a constructor first creates (308) a transport event listener (314) by instantiating a separate object of an event listener class such as the one illustrated at reference (536) on FIG. 5a.

Figure 4:
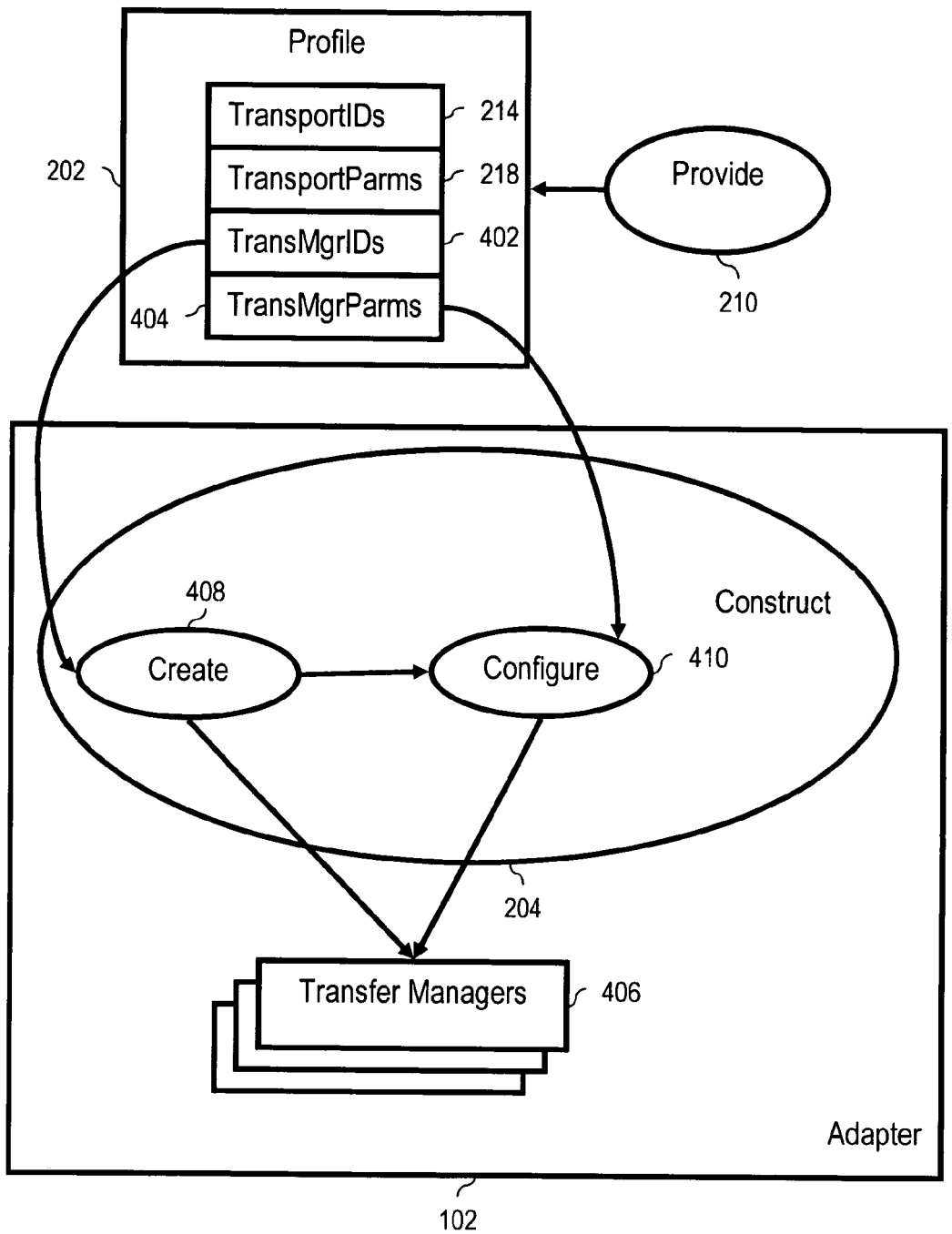
FIG. 4 sets forth a data flow diagram illustrating an exemplary method of creating transfer managers.

FIG. 4 sets forth a data flow diagram illustrating an exemplary method of creating transfer managers. In the method of FIG. 4, providing (210) an adapter profile (202) includes providing an adapter profile comprising identifications (402) of one or more transfer managers (406), including configuration parameters (404) for the transfer managers. The method of FIG. 4 includes constructing (204) an application integration adapter (102) which in turn includes creating (408) the transfer managers (406) identified (402) in the profile (202) and configuring (410) the transfer managers (406) in dependence upon the configuration parameters (404).

In terms of the exemplary data structures of FIG. 5a, the adapter (102) comprises a factory method named createTransferManagers( ) (530) for creating a transfer manager. In this example, the transfer manager list (542) in the parsed profile class (502) contains definitions for all the transfer managers defined in the profile, as well as configuration parameters for each transfer manager. Constructing such an exemplary adapter includes calling the factory method for transfer managers once for each transfer manager in the transfer manager list (542) with the configuration parameters for the transfer manager and receiving in return a reference to a new transfer manager. The references to the new transfer managers along with their attributes such as route map identifiers and calling order numbers are then stored in the transfer manager list (514) in the adapter (102) for the adapter's use in routing messages.

Figure 6:
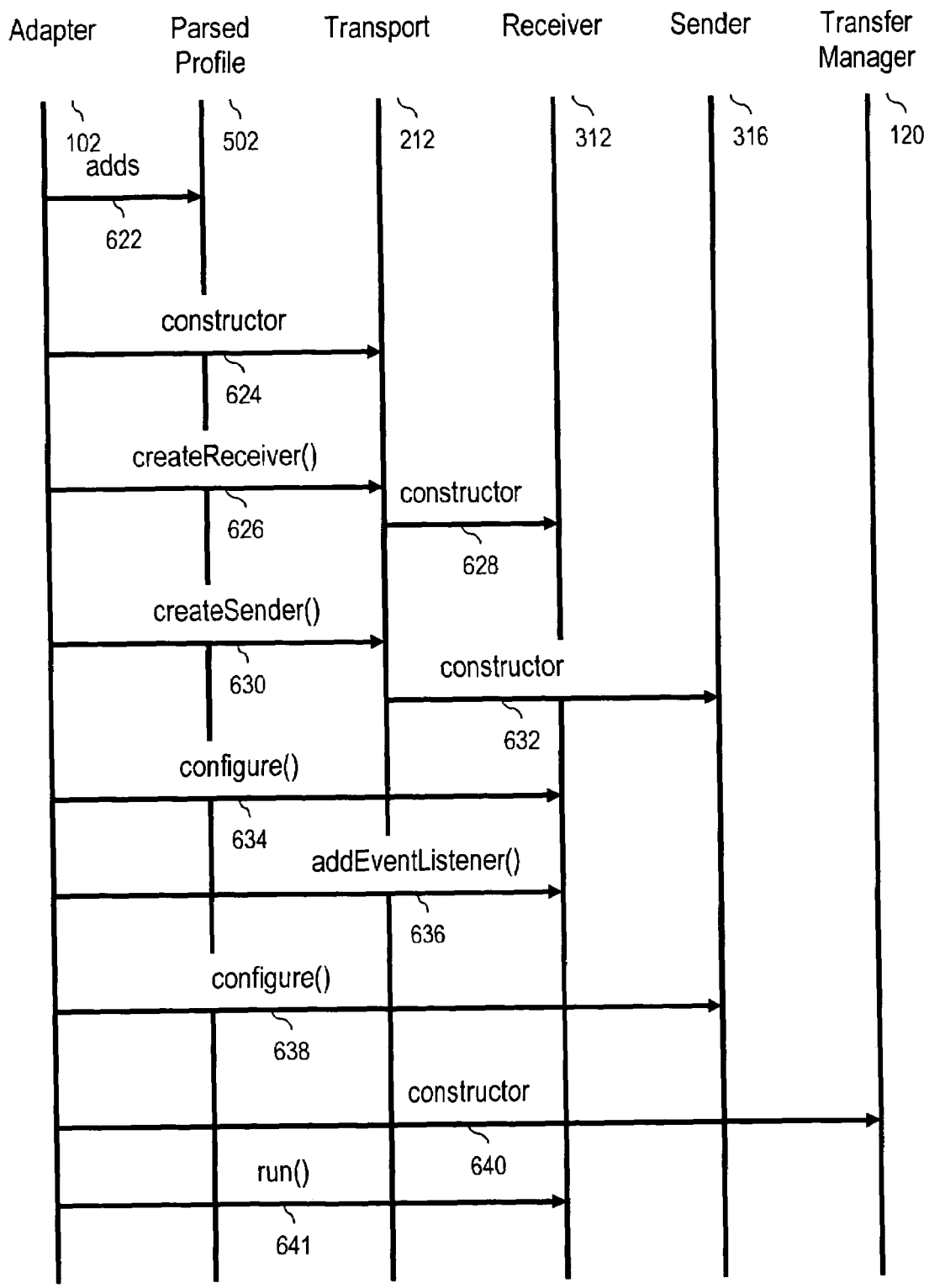
FIG. 6 sets forth a calling sequence diagram illustrating a method of constructing application integration adapters.

FIG. 6 sets forth a calling sequence diagram illustrating a method of constructing application integration adapters. More particularly, FIG. 6 describes an exemplary calling sequence among member methods in cooperating objects for constructing an adapter according to exemplary embodiments of the present invention. The sequence of FIG. 6 begins when an adapter is instantiated with a command line entry similar to this one:

Java com.adapters.Adapter<ProfileName>

A member method in the adapter, either its constructor or its main( ) method, parses the profile identified as <ProfileName> by calling (622) the add methods (FIG. 5*b*: 546, 548, 549) in a parsed profile (502 on FIG. 5*b*). The add methods insert descriptions of the transfer managers (542), the transports (544), and any route maps (555) into the member data elements of the parsed profile.

The adapter (102) constructs (624) each transport described in the parsed transport list (544 on FIG. 5*b*). The adapter calls createReceiver( ) (626) in each transport constructed, and each createReceiver( ) call results in construction (628) of a receiver for a transport. Each create Receiver( ) call (626) returns to the adapter a reference to the receiver created. The adapter stores a reference to each receiver in a receiver list (516 on FIG. 5*a*) in the adapter, particularly for use in configuring receivers and registering event listeners. The adapter calls createSender( ) (630) in each transport constructed, and each createSender( ) call results in construction (632) of a sender for a transport. Each createSender( ) call (630) returns to the adapter a reference to the sender created. The adapter stores a reference to each sender in a sender list (518 on FIG. 5*a*) in the adapter for use in configuring senders and in routing messages.

The adapter calls (634) a configure( ) method (566 on FIG. 5*d*) in each receiver (312), passing the receiver configuration parameters as call parameters, so that each receiver can self-configure. The adapter registers, in each receiver in its receiver list, either itself or another object as an event listener with a call (636) to a method such as addEventListener( ) (570 on FIG. 5*d*). The adapter calls (638) a configure( ) method (584 on FIG. 5*e*) in each sender (316), passing sender configuration parameters as call parameters, so that each sender can self-configure.

The adapter constructs (640) each transfer manager (120) identified in the profile or in the transfer manager list (542 on FIG. 5*b*) in a parsed profile (502 on FIG. 5*b*). For use in routing messages, the adapter retains references to each transfer manager in a transfer manager list (514 on FIG. 5*a*) in the adapter (102).

The adapter calls (641) a run( ) method (574 on FIG. 5*d*) in each receiver to advise each receiver to begin data communications operations in accordance with whatever protocol the receiver uses. More than one receiver must run at the same time in typical embodiments of the present invention, so that calls (641) to run( ) methods (574) advantageously are non-blocking calls that trigger a new, parallel process or thread of execution and return control promptly to the caller. More particularly, in terms of Java for example, receiver classes in such exemplary embodiments advantageously are defined to inherit from the 'thread' class with its start( ) interface method. Then in such embodiments, a call to a run( ) method is implemented as a call to SomeReceiverClass.start( ), which in turn executes the run( ) method in a separate thread of execution and returns promptly to the caller. Here is an example:

```
class HTTPReceiver extends Thread {
    private Port ListenPort = 80;
    public void run( ) {
        // control code to operate
        // a receiver over the HTTP protocol
        // for data communication from
        // a particular software application
    }
}
```

This example declares HTTPReceiver as a subclass of Thread and overrides the run( ) method from the Thread class, well known in current Java. The following exemplary Java code then can create a separate thread of execution and start it running:

HTTPReceiver aReceiver=new HTTPReceiver( );

aReceiver.start( );

This exemplifies one particular way to implement a receiver's run( ) method as a separate thread of execution, presented for explanation, not for limitation. There are many ways to start separate threads of execution for receivers as will occur to those of skill in the art, and all of them are well within the scope of the present invention. It is in this way generally, however, that an adapter instantiates and activates any number of receivers which then operate asynchronously with the adapter by, for example, use of event listeners as described in more detail below in this disclosure.

Implementing receivers' run( ) methods asynchronously as parallel separate threads of execution, however, is not a general limitation for all embodiments of the invention. Some adapters according to embodiments of the present invention in fact do not implement receiver's run( ) methods asynchronously as parallel separate threads of execution. Some adapters according to embodiments of the present invention poll receiver's run( ) methods sequentially with blocking calls. In such embodiments, an adapter's main( ) method, for example, polls each receiver in turn through a blocking call to the receiver's run( ) method. Execution of the calling method pauses until the call to the run( ) method returns. Typically in such embodiments, the receiver's run( ) method checks for incoming messages, translates the encoding format of any incoming messages as needed, encapsulates the incoming message in a message event object, and returns to the calling adapter a reference to any message event object so created. Then the adapter calls the next receiver on its receiver list. In such embodiments, event listeners optionally and advantageously may not be used—or may be used less often than in asynchronous embodiments.

At this point in processing, the receivers in our example adapter, having configured themselves with their configuration parameters and begun data communications operations in their protocols, are operating in accordance with their protocols, ready to receive messages, place the messages in message events, and hand them off to an event listener for processing through the adapter. That is, at this point, the adapter is constructed and running.

Figure 7:
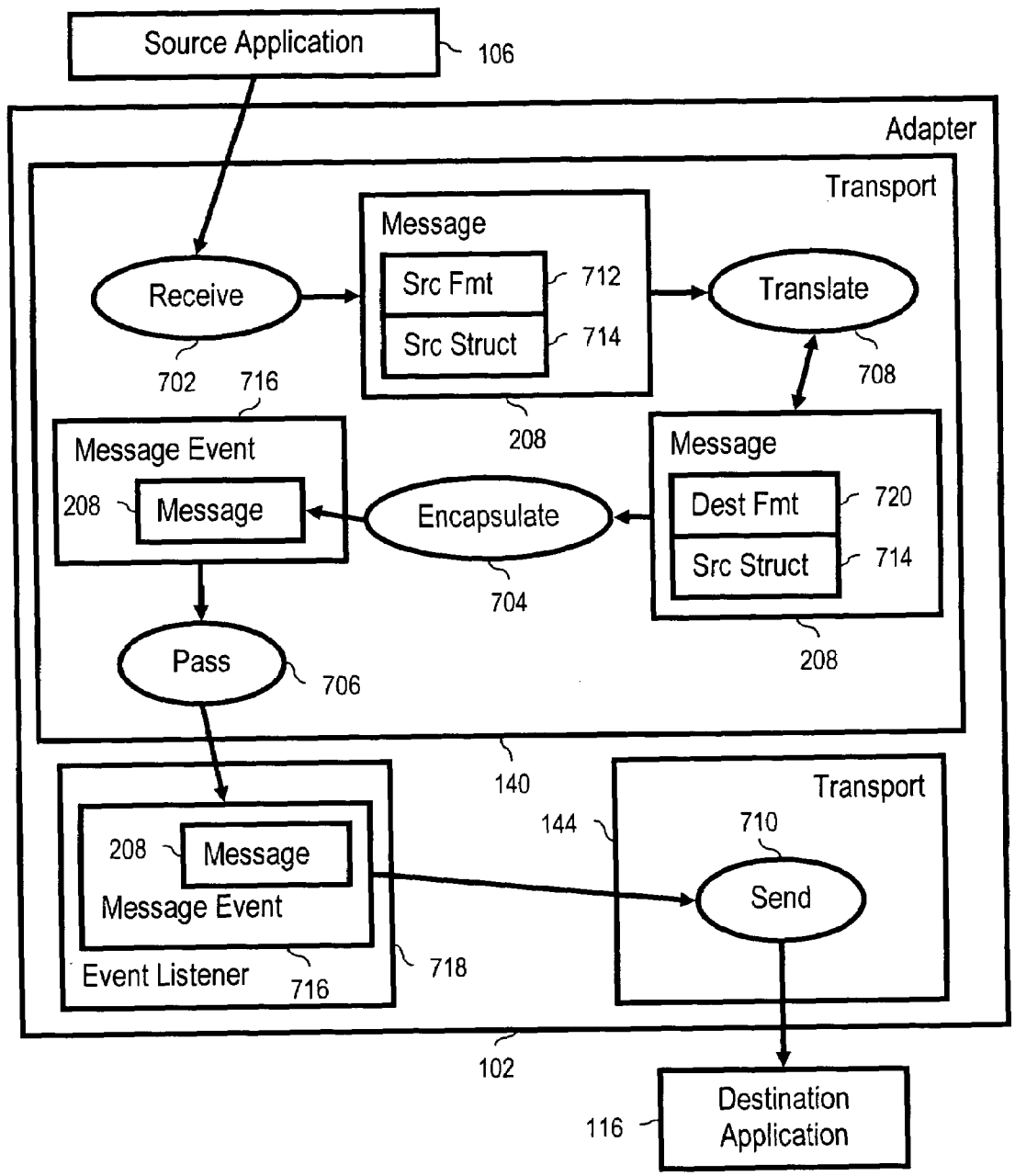
FIG. 7 sets forth a data flow diagram depicting an exemplary method of communicating integration messages among applications through an adapter.

FIG. 7 sets forth a data flow diagram depicting an exemplary method of communicating (206 on FIG. 2) integration messages (208) among applications (106, 116) through an adapter (102). The method of FIG. 7 includes receiving (702) from a source application (106) an integration message (208) having a source message format (712) and a source data structure (714). In terms of the exemplary class structures of FIG. 5*a*–5*h*, it is assumed for purposes of explanation that a run( ) method in each receiver of an adapter is carrying data communications in accordance with a data communications protocol identified in the configuration parameters for each receiver.

The method of FIG. 7 includes translating (708) the integration message (208) from the source message format (712) to a destination message format (720) useful to a destination application (116). In terms of the exemplary class structure of FIG. 5d, translating (708) is carried out by a call from a run( ) method (574) to a translation method (575) in a receiver class (560). The operation of the translation method (575) is to convert the format of the message, not the data structure of the message. That is, the translation method converts the overall form of the message leaving unchanged the internal data structure, the data element names, types, and values. Converting the internal data structure, if needed, is the job of a transformation method in a transfer manager, not the job of the receiver or its translation method. Examples of format translation include translating from stringified Java to XML, from binary C++ data format to XML, and so on. As particular example of format translation is a receiver programmed to translate the following C structure:

```
struct address
{
    char *name = "John Smith";
    char *address = "100 Main Street"
    char *city = "Smallville";
    char *state = "Iowa";
    char *zip = "10101";
}
to this XML structure:
    <address>
        <name>John Smith</name>
        <address>100 Main Street</address>
        <city>Smallville</city>
        <state>Iowa</state>
        <zip>10101</zip>
    </address>
```

Such a receiver proceeds by reading each C data elements and creating a corresponding XML element having the same name, type, and value. The C structure can be transmitted in compiled form, that is, encoded binary, or in uncompiled text appearing just as shown above. The transformation to XML preserves all structure in the data, the names, types, and values of the data elements, changing only the format from C to XML.

As practical matter, in support of asynchronous operations inside the adapter, adapters implementing the method of FIG. 7 typically also include encapsulating (704) the integration message in a message event (716) and passing (706) the message event (716), or a reference to the message event, to at least one event listener. An exemplary structure for a message event is illustrated at reference (602) on FIG. 5h. The message event class (602) contains only one member method, a constructor (616) whose only functions are to record the message parameters in the message even object and return to the calling receiver a reference to the message event. The message event parameters include its destination (604), its source (606), its message type (607), a message identification code (608), a security tag (610), a status code (612), and, usefully, the body of the message itself (614), shown here as of datatype 'stringified,' but alternatively of any useful datatype as will occur to those of skill in the art.

Passing (706) the message event (716) to an event listener is carried out in our exemplary class structures by from a receiver to a transportEvent( ) method (532 on FIG. 5a) in an event listener (536). A transportEvent( ) method (532) is shown in the adapter class (102) on FIG. 5a also as a reminder that the adapter optionally registers itself as an event listener. It is typically then the event listener, either itself or through other cooperating objects, that causes the message event to be circulated among any transfer mangers and ultimately to a send( ) method in a sender object. In typical embodiments, the sending (710) includes unencapsulating the integration message from the message event and reencapsulating it in whatever message structure is required by the data communication protocol used by the send( ) method (592 on FIG. 5e) of the destination transport (144).

The method of FIG. 7 also includes sending (710) the integration message to a destination application (116), implemented in our exemplary class structures by call to a send( ) method (592 on FIG. 5e) in a sender object (576). More particularly, the method of FIG. 7 includes no data structure transformation and no translation to a destination format. This means that the method of FIG. 7 is useful, for example, in cases where a source application and a destination application are capable of working with the same data structures, but the source application exports the data structures in binary form, stringified Java, C++ structures, or any form other than XML, and the destination application requires to import them in XML.

Figure 8:
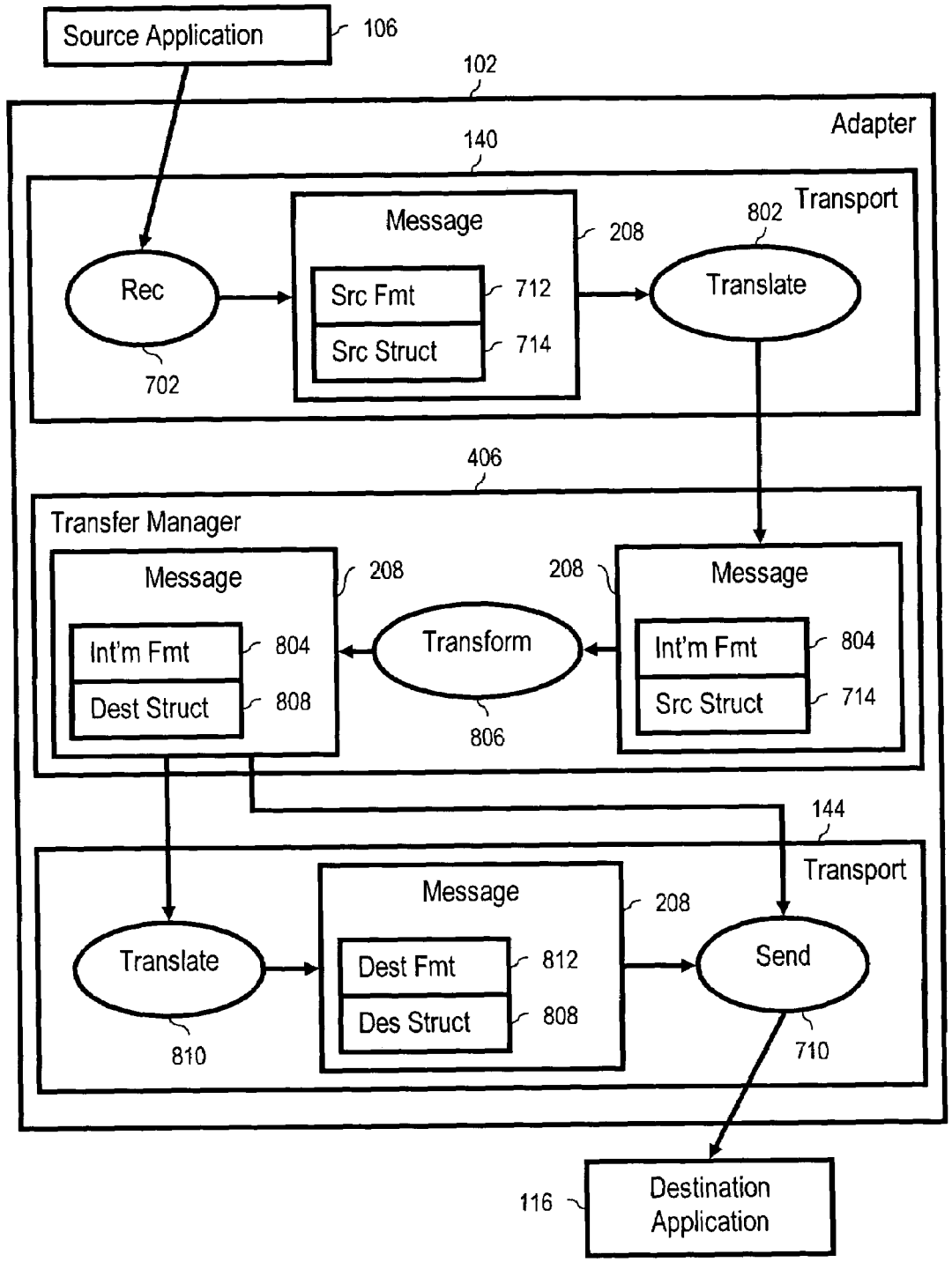
FIG. 8 sets forth a data flow diagram depicting a further exemplary method of communicating integration messages among applications through an adapter.

FIG. 8 sets forth a data flow diagram depicting a further exemplary method of communicating (206 on FIG. 2) integration messages (208) among applications (106, 116) through an adapter (102). The method of FIG. 8 includes receiving (702) from a source application (106) an integration message (208) having a source message format (712) and a source data structure (714). The method of FIG. 8 also includes translating (802) the integration message (208) from the source message format (712) to an interim message format (804) useful for internal processing within the adapter including particularly data transformation and security processing but also including other modes of processing as will occur to those of skill in the art.

The method of FIG. 8 further includes transforming (806) the integration message (208) from the source data structure (714) to a destination data structure (808). In data transformation, as distinct from data translation, the data structure itself is altered, as when the following structure from a source application:

```
<address>
    <lastName>Smith</lastName>
    <firstName>John</firstName>
    <addressLine1>100 Main Street</addressLine1>
    <addressLine2>Suite 5</addressLine2>
    <city>Smallville</city>
    <state>Iowa</state>
    <mailCode>10101</mailCode>
</address>
``` is translated to the following structure required by a destination application:

```
<address>
    <name>John Smith</name>
    <address>100 Main Street, Suite 5</address>
    <city>Smallville</city>
    <state>Iowa</state>
    <zip>10101</zip>
</address>
```

The data format is the same for both structures, the interim format for translation, in this example, XML. The data structure itself, however, is altered in its data element names and values.

In many exemplary embodiments of the method of FIG. 8, the transforming (806) is carried out through a transfer manager. Continuing with XML as an explanatory example of interim data format for data translation: transforming (806) the integration message (208) from the source data structure (714) to a destination data structure (808) is carried out in terms of our exemplary class structures by passing to transfer manager (619 on FIG. 5g) through a call to a member method such as process( ) (609 on FIG. 5g) a messageEvent object such as that illustrated at reference (602) on FIG. 5h carrying the message structure (614) as well as processing parameters needed by the transfer manager to carry out the translation.

In this example, the process(messageEvent) method (609) uses the source identification (606) and the destination identification (604) from the message event (602) to infer the filename of an XSLT style sheet from an arraylist (615) stored for that purpose in the transfer manager (619). The process( ) method (609) proceeds by calling an XSL processor (not shown), passing the name of the style sheet and the input XML as call parameters. The XSL processor reads the input XML and follows the instructions in the XSL style sheet; then it outputs the translated XML as its return to the process( ) method. Many XSL processors are readily available off-the-shelf from a variety of manufacturers including, for example, the well known 'Xalan' XSLT processor available from the Apache Software Foundation.

The method of FIG. 8 includes sending (710) the integration message to a destination application (116). FIG. 8 illustrates two exemplary execution paths for sending an integration message. FIG. 8 discloses the alternative of sending (710) the message directly without additional translation (806, 208, 710). This alternative is useful particularly when the interim message format (804) used for transforming the data structure of the message is the same as the format expected by a destination application. That is, for example, sending without additional translating is useful when, for example, the interim format (804) is XML and the destination application is capable of receiving and using an integration message in XML.

FIG. 8 also discloses the alternative of translating (810) the integration message (208) from the interim message format (804) to a destination message format (812) useful to the destination application (116). That is, as an alternative embodiment, the method of FIG. 8 includes translating (810) the integration message (208) from the interim message format (804) to a destination message format (812) useful to the destination application (116) before sending (710) the message to the destination application. This alternative is useful in the many embodiments where the message format expected by a destination application is different from the interim format (804) used for data structure transformation (806) inside an adapter. Examples of such embodiments include those in which the interim format is XML and the destination format is HTML, stringified Java, binary C++ structures, or any other message format other than XML.

Figure 9:
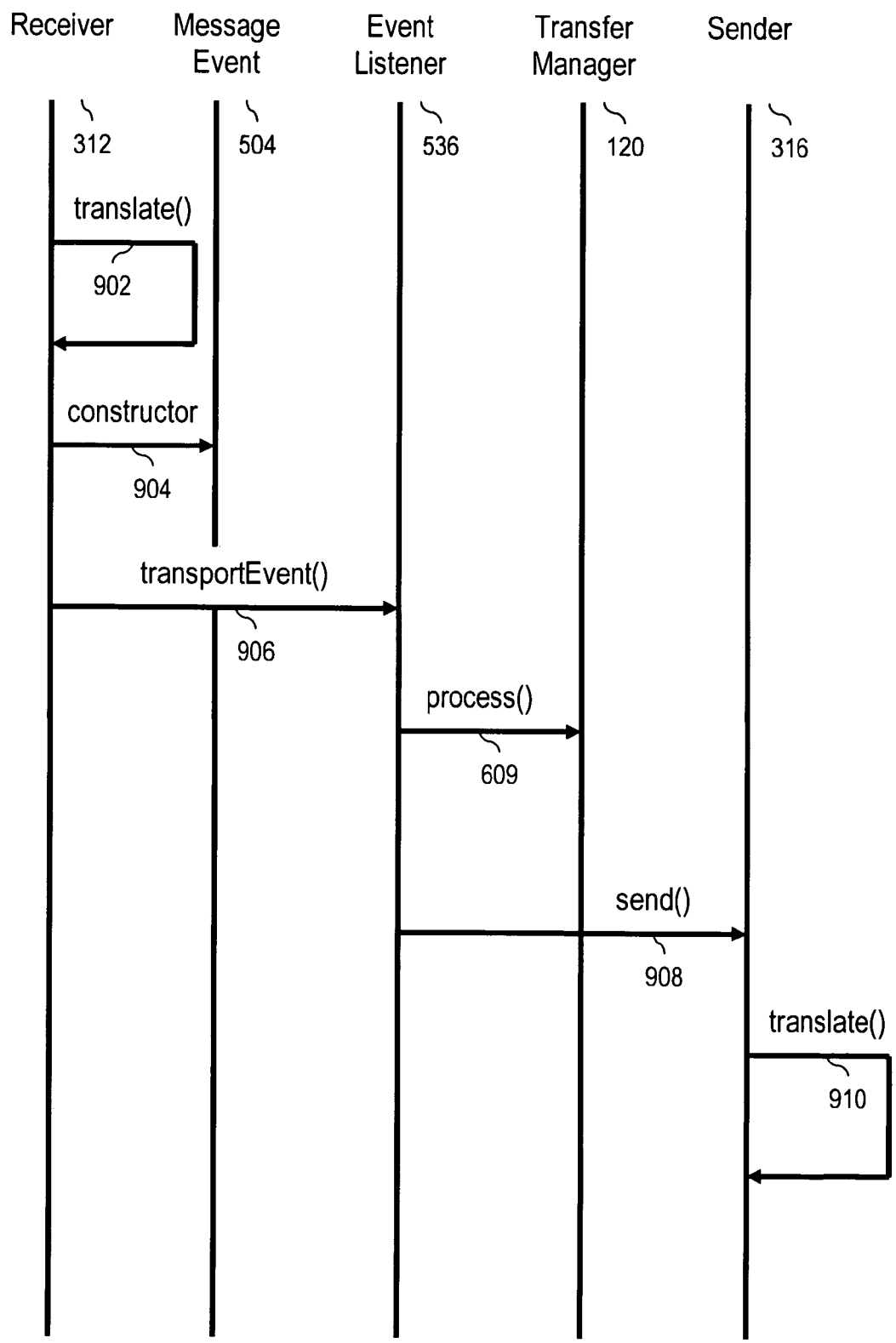
FIG. 9 sets forth a calling sequence diagram illustrating a method of communicating integration messages among applications through an adapter.

FIG. 9 sets forth a calling sequence diagram illustrating a method of communicating (206 on FIG. 2) integration messages among applications through an adapter. More particularly, FIG. 9 describes an exemplary calling sequence among member methods in cooperating objects for communicating integration messages among applications through an exemplary adapter according to embodiments of the present invention. The sequence of FIG. 6 begins when an adapter instantiated, constructed, and running as described in detail above in this disclosure. A receiver (312) of the adapter receives a message and calls (902) its own translation( ) method (575 on FIG. 5d). The translation( ) method translates the format of the body of the message into an interim format.

The receiver (312) constructs (904) a message event object (536, class structure at 602 on FIG. 5b) to use as a container for the message as the message is passed around among objects with in the adapter for further processing and transmission to its destination. The constructor of the message event object accepts as call parameters descriptive parameters of the message as well as the body of the message itself, returning to the receiver a reference to the message event object.

The receiver (312) passes the message event object through a call (906) to a transportEvent( ) method (532 on FIG. 5a), or rather passes a reference to the message event object, to an event listener object listed in an event listener list (564 on FIG. 5d) in the receiver.

The transportEvent( ) method in the event listener calls (906) each transfer manager listed in a transfer manager list (514 on FIG. 5a) in the adapter, through a process( ) method (618 on FIG. 5f, 609 on FIG. 5g) in each transfer manager, passing as a call parameter a reference to the message event object. Alternatively, the transportEvent( ) method infers a route map identification from a route map list and then calls the process( ) method in each transfer manager identified by the inferred route map identification. Either way, each transfer manager called in turn performs upon the body of the message in the message event object whatever processing each transfer manager is designed to perform, including for example data structure transformation, security checks, source authentication, encryption, decryption, validation of digital signatures, and other functions as will occur to those of skill in the art. FIG. 5g is presented as an example of a concrete transfer manager class optimized for data translation with XSLT. FIG. 5f is presented as an example of an abstract transfer manager class providing only an interface from which many concrete transfer manager classes can inherit. Using concrete transfer managers to implement classes for various processing purposes each of which inherits from an abstract transfer manger class supports an adapter's use of a factory method such as createTransferManager( ) (532 on FIG. 5a). Use of a factory class and transportEvent( ) (532 on FIG. 5a) processing against a transfer manager list (514) means that the adapter object itself need never know nor care what any particular transfer manager does to the body of any message, thereby supporting cooperation among objects within the adapter that is rendered neutral, transparent, and modular with respect to processing of message content.

The transportEvent( ) method in the sequence of FIG. 9 identifies from a list of senders (518 on FIG. 5a) in the adapter the sender in the transport for the destination of the message and calls (908) a send( ) method (592) in the destination sender (class structure illustrated at reference 575 on FIG. 5a). The send( ) method calls (910) as needed a translate( ) method (593 on FIG. 5e) in the sender to get the message body into the form needed by its destination application. Then the send( ) transmits the message to the destination application using whatever data communications protocol the sender is configured to use.

Dynamic Alteration of Application Integration Adapters

Figure 10:
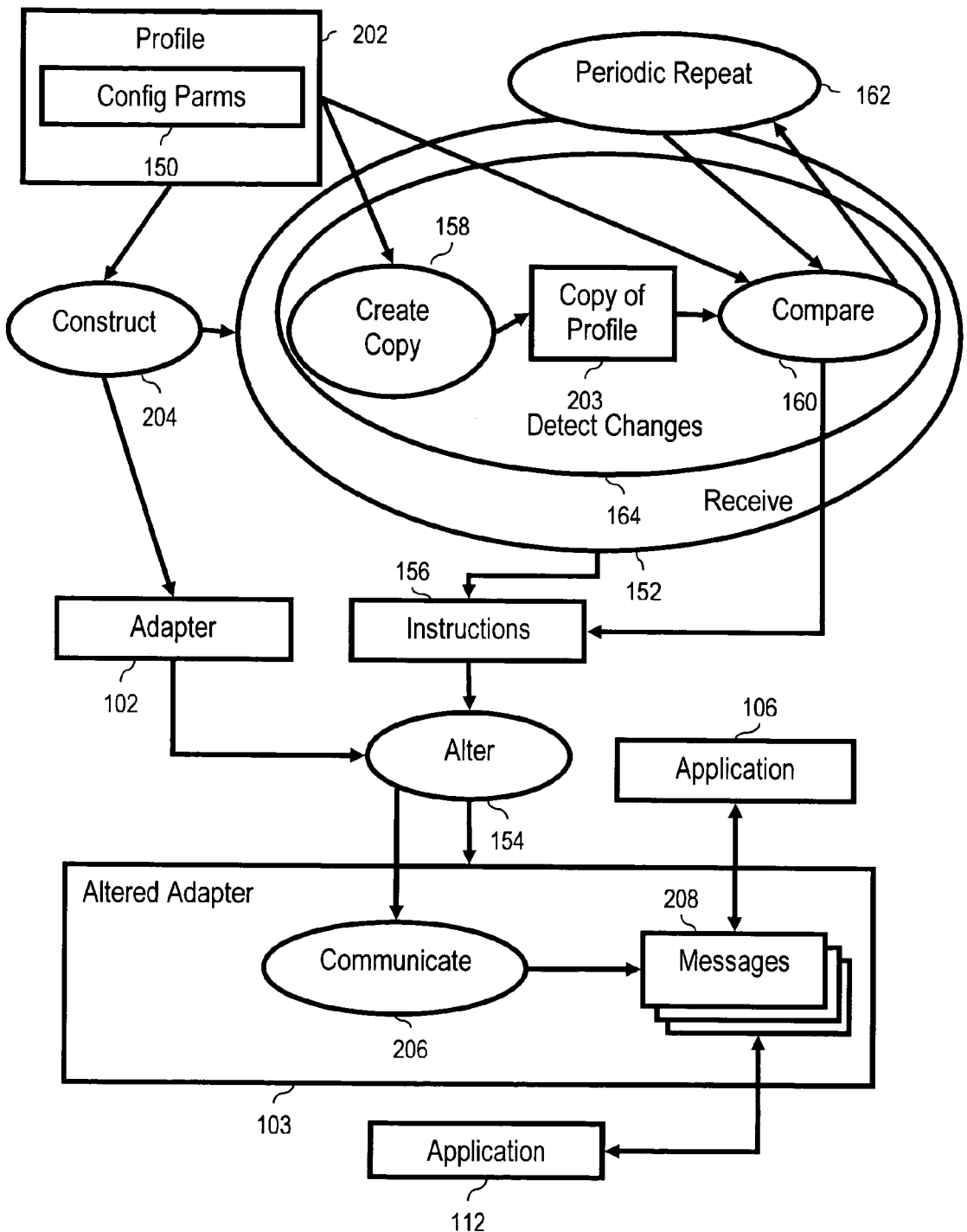
FIG. 10 sets forth a data flow diagram illustrating a further method of application integration that includes altering the adapter.

FIG. 10 sets forth a data flow diagram illustrating a further method of application integration that includes constructing (204) an application integration adapter (102) in dependence upon a profile (202) comprising data describing the adapter (150). The method of FIG. 10 also includes receiving (152) instructions (156) to alter the adapter and altering (154) the adapter in dependence upon the instructions (156).

Application integration adapters according to the method FIG. 10 are like the other exemplary adapters described above in this disclosure, comprising generally data communications transports, senders, receivers, optionally transfer managers, and so on. Adapters according to FIG. 10, however, also include the capabilities of receiving and carrying out instructions to alter themselves, and such adapters can carry out such alterations dynamically, while they are running, as part of their normal operations, with no need to stop, pause, reinstall, or reboot anything.

In fact, the method of FIG. 10 also includes communicating (206) integration messages (208) among applications (112, 106) through the adapter (103) as altered. That is, after an adapter is altered according to the method of FIG. 10, adapter operations continue normally except that they now include the alterations. Normal adapter operations include receiving integration messages from applications, translating the format of the messages if needed, encapsulating the messages in message event objects, routing the message event objects through the adapter, through transfer managers, to a sender, translating format again as needed, and sending messages to destinations, all as described in detail above in this disclosure.

Alterations can affect all adapter elements, transports, receivers, senders, transfer managers, and so on. Alterations can affect all adapter operations influenced by configuration parameters, telephone numbers, port numbers, network addresses, URIs, and so on. Some changes in configuration parameters are so drastic as to effectively require the entire replacement of a component, such as a complete change from one communications protocol to another. Alterations can include such changes: Adding to a running adapter integration support for an entirely new application with a new transport, new receiver, new sender, and zero or more new transfer managers. Alternations can include deleting or stopping operation of an existing receiver, sender, or transport manager while the remainder of the adapter continues operations without pausing, stopping, or restarting. Excluding pausing, stopping, or restarting, however, is not a limitation of the invention. Embodiments can include pausing, stopping, or restarting, and in fact administration integrations messages themselves can include instructions for alteration effecting pausing, stopping, or restarting of components of an adapter or an entire adapter.

In the method of FIG. 10, the data describing the adapter (150) comprises data identifying communications protocols and data identifying applications programs. The 'data describing the adapter' (150) is generally the identifications of transports, sender, receivers, transfer managers, map routes, and their configuration parameters set forth in a profile (202), all as described in detail earlier in this disclosure. Configuration parameters for the data communications modules, senders and receivers, are 'data identifying communications protocols' in the sense that both the data communications modules and their configuration parameters are protocol-specific. A receiver using HTTP has configuration parameters has IP addresses and port numbers for configuration parameters. A sender that transmits files over phone lines has filenames and telephone numbers for configuration parameters. And so on. Similarly, both the identities and the configuration parameters of transports, senders, and receivers are generally 'data identifying applications programs,' in the sense that they too are application-specific. A receiver generally expects to receive messages in a particular data format, having a particular data structure, and generally such particularities are associated with a particular application program. It is within the scope of the invention that a transport, receiver, or sender is used with more than one application, but even then its implementation is expected to be generally applications-specific in that separate instances of such modules will need to be specified in a profile and dedicated to communicating with particular instances of the applications. For all these reasons, even if the name of a particular application or protocol as such does not appear in a profile, nevertheless, generally speaking, data describing an adapter (150) typically does, directly or indirectly, expressly or implicitly, identify communications protocols and applications programs.

In many adapters implemented according to the method of FIG. 10, receiving (152) instructions (156) to alter the adapter (102) includes detecting (164) changes in the adapter profile (202). In many such embodiments, the adapter profile is an editable file residing at some path location on a file system. In many embodiments, the adapter profile is an easily editable text file such as an XML file. Users authorized to do so can edit such a file at any time with a text editor or word processor. In fact, user authorized to do so can edit the profile while the adapter is running thereby creating a profile that no longer accurately describes its adapter.

In such embodiments, detecting (164) changes in the adapter profile (202) often also includes creating (158) a copy (203) of the profile and periodically (162) comparing (160) the profile (202) and the copy (162). That is, one way to receive instructions to alter an adapter is for the adapter itself to keep a copy of its profile and periodically compare the copy of the profile to the profile itself. If the profile changes between comparisons, then the changes in the profile are interpreted as instructions for alterations. That is, in such embodiments, changes in the profile comprise instructions for alterations.

If, for example, in such an embodiment, the copy (203) of the profile is this:

```
<adapter>
  <transportmodules>
    <transport class="InventoryControl.java" id="inventoryControl">
      <receiver configParms="abc"></receiver>
      <sender configParms="xyz"></sender>
    </transport>
    <transport class="GeneralLedger.java" id="generalLedger">
      <receiver configParms="def"></receiver>
      <sender configParms="uvw"></sender>
    </transport>
  </transportmodules>
  <transfermodules>
    <transferManager class="xfrMgr1.java" order=
      "1"></transferManager>
    <transferManager class="xfrMgr2.java" order=
      "2"></transferManager>
  </transfermodules>
</adapter>
``` and the profile (202) as changed is this:

```
<adapter>
  <transportmodules>
    <transport class="InventoryControl.java" id="inventoryControl">
```

-continued

```
    <receiver configParms="abc"></receiver>
    <sender configParms="xyz"></sender>
  </transport>
  <transport class="GeneralLedger.java" id="generalLedger">
    <receiver configParms="def"></receiver>
    <sender configParms="uvw"></sender>
  </transport>
  <transport class="Purchasing.java" id="purchasingSystem">
    <receiver configParms="ghi"></receiver>
    <sender configParms="rst"></sender>
  </transport>
</transportmodules>
<transfermodules>
  <transferManager class="xfrMgr1.java" order=
  "1"></transferManager>
  <transferManager class="xfrMgr2.java" order=
  "2"></transferManager>
  <transferManager class="xfrMgr2.java" order=
  "3"></transferManager>
</transfermodules>
</adapter>
``` then the detected changes after comparison and therefore the instructions (156) for altering the adapter are this:

```
<add>
  <transportmodules>
    <transport class="Purchasing.java" id="purchasingSystem">
      <receiver configParms="ghi"></receiver>
      <sender configParms="rst"></sender>
    </transport>
  </transportmodules>
  <transfermodules>
    <transferManager class="xfrMgr2.java"
    order="3"></transferManager>
  </transfermodules>
</add>
```

If, for another example, the copy (203) of the profile is this:

```
<adapter>
  <transportmodules>
    <transport class="InventoryControl.java" id="inventoryControl">
      <receiver configParms="abc"></receiver>
      <sender configParms="xyz"></sender>
    </transport>
    <transport class="GeneralLedger.java" id="generalLedger">
      <receiver configParms="def"></receiver>
      <sender configParms="uvw"></sender>
    </transport>
    <transport class="Purchasing.java" id="purchasingSystem">
      <receiver configParms="ghi"></receiver>
      <sender configParms="rst"></sender>
    </transport>
  </transportmodules>
  <transfermodules>
    <transferManager class="xfrMgr1.java"
    order="1"></transferManager>
    <transferManager class="xfrMgr2.java"
    order="2"></transferManager>
    <transferManager class="xfrMgr2.java"
    order="3"></transferManager>
  </transfermodules>
</adapter>
``` and the profile (202) as changed is this:

```
<adapter>
  <transportmodules>
    <transport class="InventoryControl.java" id="inventoryControl">
      <receiver configParms="abc"></receiver>
      <sender configParms="xyz"></sender>
    </transport>
    <transport class="GeneralLedger.java" id="generalLedger">
      <receiver configParms="def"></receiver>
      <sender configParms="uvw"></sender>
    </transport>
  </transportmodules>
  <transfermodules>
    <transferManager class="xfrMgr1.java"
    order="1"></transferManager>
    <transferManager class="xfrMgr2.java"
    order="2"></transferManager>
  </transfermodules>
</adapter>
``` then the detected changes after comparison and therefore the instructions (156) for altering the adapter are this:

```
<delete>
  <transportmodules>
    <transport class="Purchasing.java" id="purchasingSystem">
      <receiver configParms="ghi"></receiver>
      <sender configParms="rst"></sender>
    </transport>
  </transportmodules>
  <transfermodules>
    <transferManager class="xfrMgr2.java"
    order="3"></transferManager>
  </transfermodules>
</delete>
```

If, for still another example, the copy (203) of the profile is this:

```
<adapter>
  <transportmodules>
    <transport class="InventoryControl.java" id="inventoryControl">
      <receiver configParms="abc"></receiver>
      <sender configParms="xyz"></sender>
    </transport>
    <transport class="GeneralLedger.java" id="generalLedger">
      <receiver configParms="def"></receiver>
      <sender configParms="uvw"></sender>
    </transport>
  </transportmodules>
  <transfermodules>
    <transferManager class="xfrMgr1.java"
    order="1"></transferManager>
    <transferManager class="xfrMgr2.java"
    order="2"></transferManager>
  </transfermodules>
</adapter>
``` and the profile (202) as changed is this:

```
<adapter>
  <transportmodules>
    <transport class="InventoryControl.java" id="inventoryControl">
      <receiver configParms="jkl"></receiver>
      <sender configParms="mno"></sender>
    </transport>
    <transport class="GeneralLedger.java" id="generalLedger">
```

```
        <receiver configParms="def"></receiver>
        <sender configParms="uvw"></sender>
    </transport>
</transportmodules>
<transfermodules>
    <transferManager class="xfrMgr1.java"
        order="1"></transferManager>
    <transferManager class="xfrMgr3.java"
        order="2"></transferManager>
</transfermodules>
</adapter>
``` then the detected changes after comparison and therefore the instructions (156) for altering the adapter are this:

```
<changeParms>
    <transportmodules>
        <transport class="InventoryControl.java" id="inventoryControl">
            <receiver configParms="jkl"></receiver>
            <sender configParms="mno"></sender>
        </transport>
    </transportmodules>
</changeParms>
<delete>
    <transfermodules>
        <transferManager class="xfrMgr2.java"
            order="2"></transferManager>
    </transfermodules>
</delete>
<add>
    <transfermodules>
        <transferManager class="xfrMgr3.java"
            order="2"></transferManager>
    </transfermodules>
</add>
```

This example of instructions for altering an adapter includes instructions to change the operating parameters of the sender and receiver for an inventory control application. Changing parameters can be carried out by additional calls to configuration methods, such as, for example, those shown for receivers at reference (566) on FIG. 5d, for senders at reference (584) on FIG. 5e, and for transfer managers at reference (621) on FIGS. 5f and 5g. For a sender and receiver effecting data communications over HTTP, then, for example, the parameter changes could include changes in port numbers or IP addresses.

In addition, the example instructions for alterations set forth just above in this disclosure include an instruction to delete a transfer manager embodied as Java class xfrMgr2.java and replace it with a transfer manager embodied as Java class xfrMgr3.java. Such a deletion can be carried out by use of a change detector class similar to the one described in the following pseudocode:

```
Class ChangeDetector extends Thread{
    private String aProfile, aCopy;
    private String instructionsForAlterations;
    private Adapter myAdapter;
    public void setAProfile( );
    public void setMyAdapter( );
    public void run( ) {
        while(1) { // run forever
            aCopy = createCopy(aProfile);
            sleep(60,000); // wait a minute: 60,000 milliseconds
            instructionsForAlterations = compare(aProfile, aCopy);
```
```
            alter(Adapter myAdapter, String
                instructionsForAlterations);
        }
    }
}
```

This exemplary pseudocode declares ChangeDetector as a subclass of Thread and overrides the run( ) method from the Thread class, so that the change detector can operate asynchronously within the adapter to detect changes as they occur, or in this example at least, within one minute after they occur. The following exemplary Java pseudocode, typically called from a main( ) method in an adapter object (520 on FIG. 5a) or even from an adapter's constructor, then can create a separate thread of execution for the change detector and start it running:

ChangeDetector aChangeDetector=new ChangeDetector( );
    aChangeDetector.start( );

Such a change detector object can obtain references or filenames for profiles through its constructor or through an accessor method such as setAProfile( ). This example of a change detector object gets a reference to its adapter, again, from its constructor or from an accessor method such as setMyAdapter( ). Accessor methods can be called from Adapter.main( ) by the following exemplary pseudocode:

aChangeDetector.setAProfile(String profileFilename);
    aChangeDetector.setMyAdapter(Adapter myAdapter);

The method of FIG. 10 includes altering (154) the adapter in dependence upon the instructions (156). Altering an adapter can be carried out as shown in the pseudocode change detector class set forth above which contains a call to an exemplary method:

alter(Adapter myAdapter, String instructionForAlteration);

The alter( ) method accepts as call parameters a reference to an adapter and a string containing instructions for altering the adapter. The alter( ) method in this example is programmed to operate in accordance with the instructions for altering the adapter to create new adapter components, delete existing adapter components, or change the operating parameters of existing adapter components.

In some embodiments, a method like the alter( ) example creates new adapter components in a manner similar to that described above in this disclosure for constructing adapters. That is, in altering an adapter according to the following instructions for alteration:

```
<add>
    <transportmodules>
        <transport class="Purchasing.java" id="purchasingSystem">
            <receiver configParms="ghi"></receiver>
            <sender configParms="rst"></sender>
        </transport>
    </transportmodules>
    <transfermodules>
        <transferManager class="xfrMgr2.java"
            order="3"></transferManager>
    </transfermodules>
</add>
``` a method like the alter( ) example instantiates a transport object of class Purchasing.java, instantiates a receiver, configures the receiver with configuration parameters "ghi,"

lists the receiver in a receiver list in an adapter, instantiates a sender through a call to a factory method in the transport, configures the sender with configuration parameters "rst," lists the sender in a sender list in the adapter, instantiates a transfer manager of the class xfrMgr2.java, lists the transfer manager in a transfer manager list in the adapter, and so on.

In some embodiments, a method like the alter( ) example deletes existing adapter components by calling member methods in the components themselves. That is, in altering an adapter according to the following instructions for alteration:

```
<delete>
    <transportmodules>
        <transport class="Purchasing.java" id="purchasingSystem">
            <receiver configParms="ghi" id="rcv1"></receiver>
            <sender configParms="rst" id="snd1"></sender>
        </transport>
    </transportmodules>
    <transfermodules>
        <transferManager class="xfrMgr2.java" id="xfrMgr2"
            order="3"></transferManager>
    </transfermodules>
</delete>
``` a method like the alter( ) example typically calls accessor methods in the adapter itself. Remember that in many exemplary adapters according to the present invention, Adapter.main( ) carries out its processing by identifying receivers, senders, and transfer managers by use of lists maintained inside the adapter itself (514, 516, 518 on FIG. 5*a*). If a transfer manager, a receiver, or a sender is removed from the list, then the adapter is no longer aware that that transfer manager, receiver, or sender exists. In Java, garbage collection will remove the unused object. In C++, the deletion method would need also to call destructors to remove unused objects. Asynchronous receivers operating in separate threads of execution also need their threads stopped.

More particularly, in this example, the alter( ) method is programmed to call Adapter.deleteSender(String "snd1") (reference 256 on FIG. 5*a*) to delete senders. The deleteSender( ) method is programmed to look up the sender named "snd1" in its sender list (518 on FIG. 5*a*) and remove it from the list. In Java, that is all there is to it. Java garbage collection will clean away the unused sender object. In C++, deleteSender( ) would get a reference to the sender from the sender list, call the sender's destructor, and remove the sender from the sender list. In such exemplary embodiments, deleting a transfer manager is carried out in the same fashion: alter( ) calls deleteTransferManager(String "xfrMgr2") (252 on FIG. 5*a*) which in turn removes the transfer manager from the transfer manager list (514), calling the transfer manager's destructor if needed.

Polled receivers are deleted in the same way, but asynchronous receivers operating in separate threads of execution advantageously have their threads stopped also. Java objects that inherit from Java's 'Thread' class include a stop( ) method which abruptly halts operation of a Java thread. Java threads can also be stopped by including in them a separate method for signaling the need to stop by setting some member flag so that the run( ) method in such objects can check the flag regularly, detect the need to stop, and make an orderly return from the run( ) method.

Figure 11:
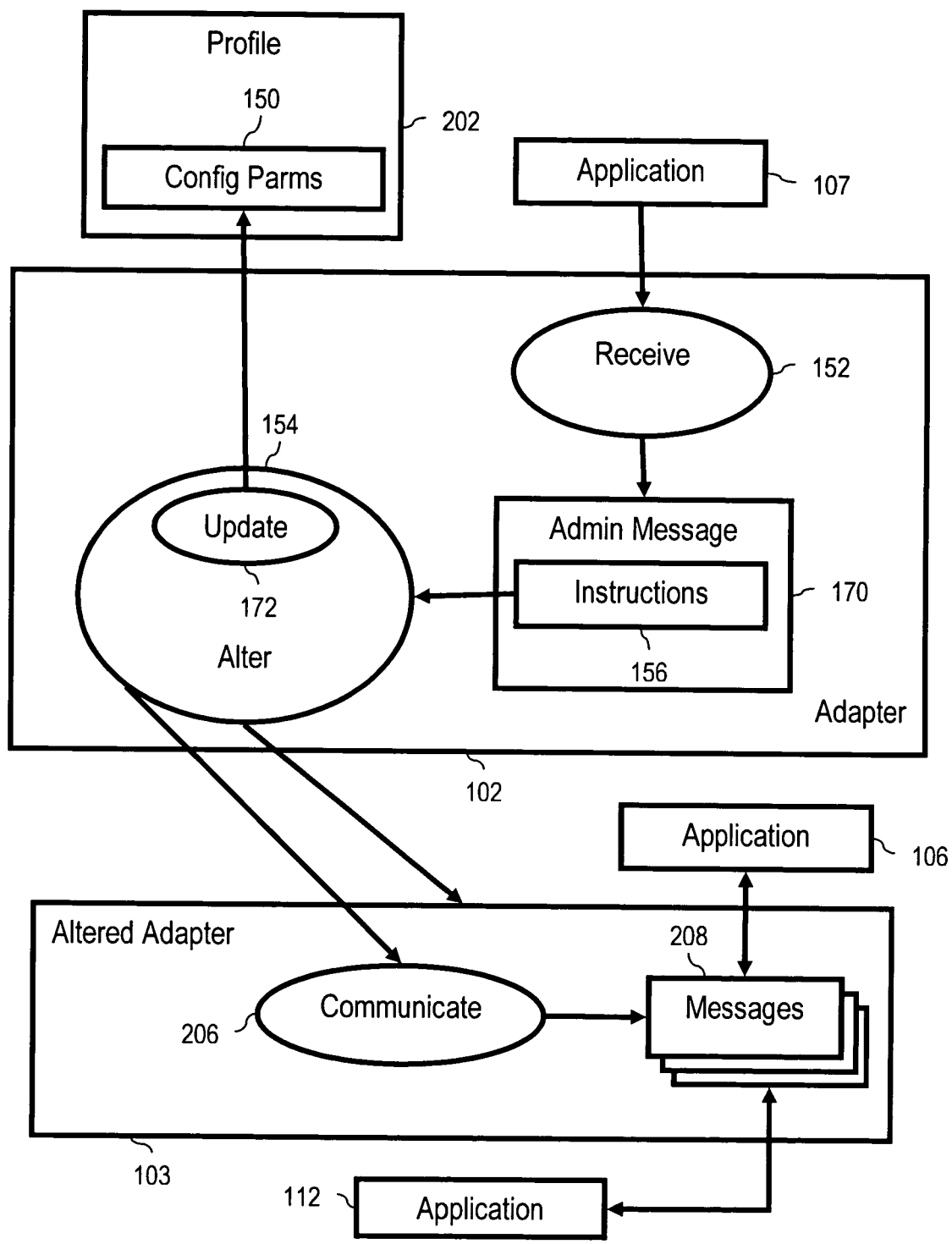
FIG. 11 sets forth a data flow diagram illustrating a further exemplary method of application integration that includes receiving from an application an administrative integration message bearing instructions to alter the adapter.

In the scope of the present invention, there is more than one way to receive instructions to alter an adapter. FIG. 11 sets forth a data flow diagram illustrating a further exemplary method of application integration in which receiving (152) instructions (156) to alter an adapter (102) comprises receiving from an application (107) an administrative integration message (170) bearing the instructions (156) to alter the adapter.

Applications sending administrative messages can be any application programmed to support administrative messages, such as, for example, a new application programmed to transmit upon its own startup an XML message over HTTP requesting adding to an adapter a one or more transports, one or more receivers, one or more senders, and zero or more transfer managers to support integration of the new application with one or more other applications, including route mapping instructions. Because such a new application would have not yet have its own receiver to which to send the message, some embodiments provide and make public the network address of receiver dedicated to listening for administrative messages. After a new application is coupled to its own receiver, then the new application thereafter can send its administrative messages directly to its own receiver in an adapter.

For further explanation of the method of FIG. 11, the receive function (152) is considered to be implemented as a run( ) method (574 on FIG. 5*d*) in a receiver object of a receiver class similar to the one shown at reference (560) on FIG. 5*a*, inheriting from Java's 'Thread' class, with the run( ) method operating asynchronously in its own thread of execution. This exemplary receiver administers an administrative integration message (170) very much like any other message. That is, this exemplary receiver operates just like the asynchronous receivers described in more detail above in this disclosure, receiving the message, translating its format as needed, encapsulating it in a message event, passing the message event to an event listener, and so on. Administrative integration messages are distinguished in their treatment by the receiver, however, in that the receiver writes in the message Type fields (607 on FIG. 5*h*) of message event objects a code value identifying them as administrative integration messages, a value such as, for example, "admin." In addition, the receiver writes in the destinationID field (604 on FIG. 5*h*) of the message event objects for such messages an indication that the destination of the message is the adapter itself rather than a destination application. The receiver stores the instructions for altering the adapter in the body (614) of the message in the message event object. Just as it would for other message types, the receiver passes a reference to the message event object by calling a transportEvent(messageEvent) method (532 on FIG. 5*a*) in an event listener registered (564 on FIG. 5*d*) in the receiver.

In this example, the transportEvent( ) method, having available to it the source, destination, and type of the administrative message in the message event, can identify, in dependence upon the source, destination, and message type values, a route map for the message event and route the message event carrying the instructions for altering the adapter to one more transfer managers just as would be done for any other message. Transfer managers can be programmed and organized in a route to carry out the details of altering the adapter, creating new components, deleting or changing parameters for existing components, and so on.

As an alternative to using transfer managers to carry out alterations of adapters, in some embodiments, the transportEvent( ) method is programmed to note the messageType code of messageEvents passed to it and pass on the administrative messages to a member method designed to carry out the instructions for altering the adapter, such as, for example, the member method alter( ) (258 on FIG. 5a), which operates in a manner similar to that described above for the alter( ) method in the class ChangeDetector. That is, Adapter.alter( ) can be called by the transportEvent( ) method as:

Adapter.alter(MessageEvent aMessageEvent);

Adapter.alter( ) operates a little differently from ChangeDetector.alter( ). ChangeDetector.alter( ) accepts as call parameters a reference to an adapter and a string containing instructions for altering the adapter. Adapter.alter( ), however, is a member method within the adapter object of the adapter to be altered, so does not need a call parameter reference to the adapter. Also, the transportEvent( ) method in the event listener is programmed only to hand off the administrative message event, not to process it any further. The transportEvent( ) method, therefore, in this example, does not extract the message body, the instructions for altering the adapter, and pass it to Adapter.alter( ) as a String. Instead, the transportEvent( ) method passes to Adapter.alter( ) the entire message event, leaving it up to Adapter.alter( ) to extract the body of the message from the messageEvent object as a String comprising the instructions for altering the adapter. Subject to these exceptions, however, the operations of Adapter.alter( ) are similar to those of ChangeDetector.alter( ) described in detail above in this disclosure. That is, Adapter.alter( ) method is programmed to operate in accordance with the instructions for altering the adapter to create new adapter components, delete existing adapter components, or change the operating parameters of existing adapter components, as described in detail for ChangeDetector.alter( ) above in this disclosure.

Receivers for administrative messages can be polled as well as asynchronous. In a typical polled embodiment, there would be no event listener and no transportEvent( ) method. Instead, the run( ) method in a receiver would return messageEvent directly to the polling function, in this example, the main( ) method in the adapter (520 on FIG. 5a). The polling function would note messageEvent.messageType=="admin" and pass the messageEvent to the alter( ) method (258 on FIG. 5a) to carry out alterations to the adapter according to the instructions encapsulated in the body String of the message event (614 on FIG. 5h).

In adapters according to the method of FIG. 11, altering (154) the adapter in dependence upon the instructions (156) typically further comprises updating (172) the profile (202) to reflect the instructions, so that the profile maintains a currently correct description of the adapter as altered. In embodiments that use an XML document as a profile, updating can be carried out manually though a text editor or word processor. Alternatively, updating for such embodiments often is automated through an update( ) method programmed to combine both the instructions for altering a profile as well as the old profile into an updated profile, a new XML document. In embodiments that maintain a parsed profile (502 on FIG. 5b) in working memory, altering (154) the adapter often includes parsing (522 on FIG. 5a) the updated profile into a parsed profile in working memory, so that the parsed profile also is maintained with currently correct content depicting the adapter components as altered in accordance with the instruction (156).

Development and Installation of Application Integration Adapters

Figure 12:
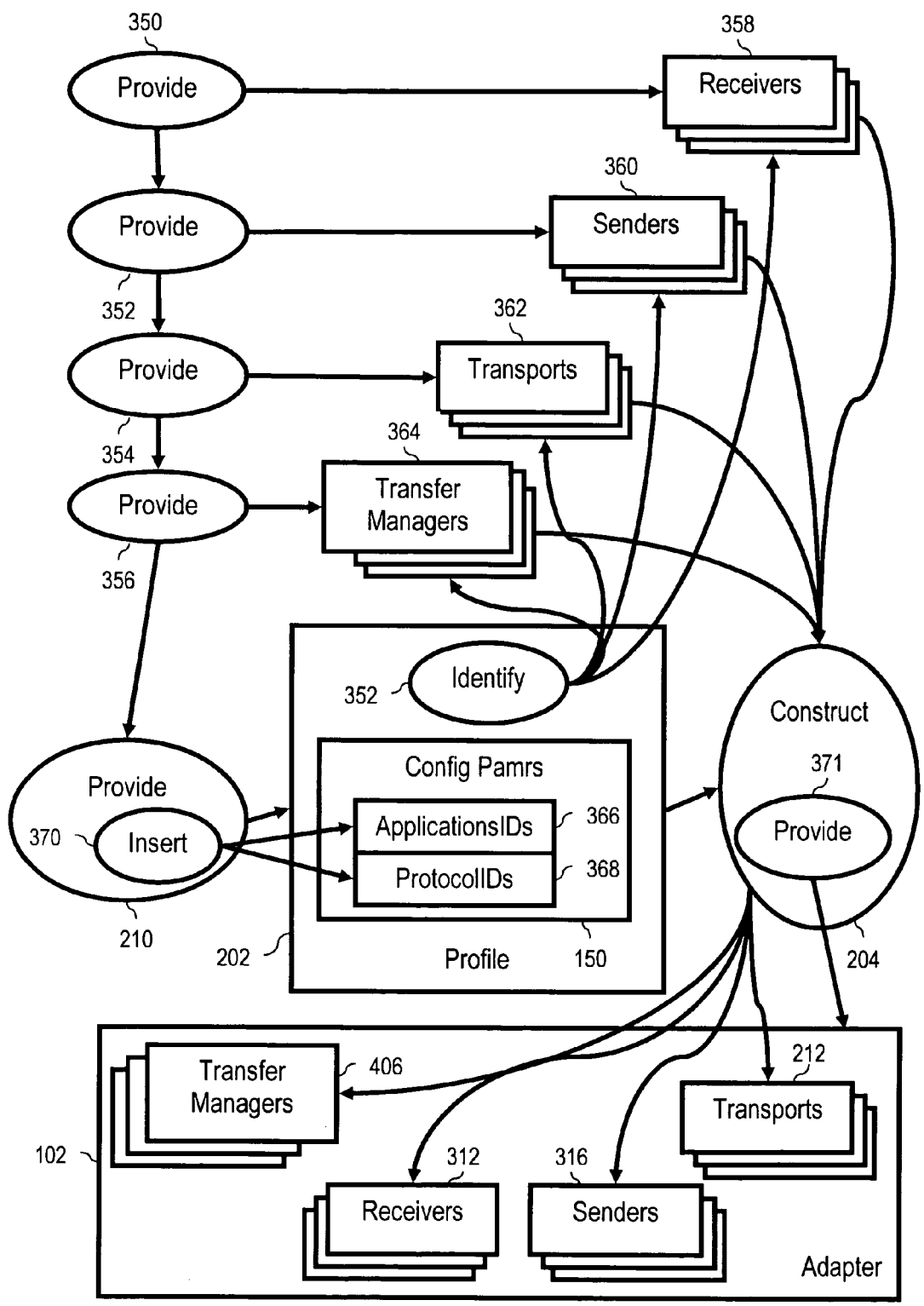
FIG. 12 sets forth a data flow diagram of a method of application integration by which the modular, plug-and-play aspects of adapters according to various embodiments of the present invention are further explained.

As readers realize by now, it is a particular advantage of the present invention that adapter components according to various embodiments of the present invention, transports, receivers, senders, transfer managers, and so on, are provided as modular components and used in a plug-and-play fashion to build application integration adapters. FIG. 12 sets forth a data flow diagram of a method of application integration by which the modular, plug-and-play aspects of adapters according to various embodiments of the present invention are further explained.

More particularly, FIG. 12 sets forth a data flow diagram illustrating a method of application integration that includes providing (350) a multiplicity of predefined data communications receivers (358), each receiver specific to a software application and a communications protocol. Providing predefined data communications receivers is carried out by designing and developing receivers as software having the structures, characteristics, and capabilities of data communications and data format translation described in detail above in this disclosure. That is, providing predefined data communications receivers is carried out, for example, in many embodiments of the present invention, by designing and developing software classes such as the example illustrated at FIG. 5d, having member data elements for storing configuration parameters (362) and event listeners (564, for receivers executing in separate parallel threads) and member methods for configuration (566), access to member data elements (568, 570), data translation of received messages (575), and execution of a receive function (574) that can be a blocking method or a method that runs in a separate thread of execution. Such provided receivers are typically specific to a particular software application in that any particular receiver is provided to couple for data communications, not only to a particular application, but in many installations, to a particular instance of an application. In addition, such provided receivers typically are specific to a particular software application in that such receivers are designed and developed either to carry out translation of data formats having structures unique to a particular software application or to know that translation is not needed for integration of the application with which such a provided receiver is designed to communicate.

Such provided receivers are typically specific to a particular communications protocol in that the receiver itself is designed and programmed as software to implement or utilize, a particular data communications protocol, HTTP, SOAP, IIOP, TCP/IP, SMTP, POP, and so on. A receiver can 'implement' a protocol in a fairly literal sense: the receiver itself is developed as an HTTP server, a SOAP server, a TCP/IP server, and so on. Data communications access to such receivers appears from their related applications as calls to URIs, internet addresses, port numbers, sockets, and so on. Another exemplary way that a provided receiver can be specific to a particular protocol is by 'utilizing' the protocol, rather than actually implementing the protocol. 'Utilizing' the protocol means that operation of the receiver depends on availability of the protocol, as, for example, when a particular receiver is designed and implemented with attendant interoperable object references made available to the application program with which the receiver is designed to communicate so that the application can communicate with the receiver by making IIOP calls or Java RMI calls. Such provided receivers do not actually 'implement' IIOP or RMI, but they 'utilize' IIOP or Java RMI in that their data communications with their applications are carried out over such a protocol. Data communications access to such receivers appears from their applications as ordinary calls to member methods known to the application software itself.

The method of FIG. 12 also includes providing (352) a multiplicity of predefined data communications senders (360), each sender specific to a software application and a communications protocol. Providing predefined data communications senders is carried out by designing and developing senders as software having the structures, characteristics, and capabilities of data communications and data format translation described in detail above in this disclosure. That is, providing predefined data communications senders is carried out, for example, in many embodiments of the present invention, by designing and developing software classes such as the example illustrated at FIG. 5e, having member data elements for storing configuration parameters (578) and member methods for configuration (584), access to member data elements (586), data translation of messages to be sent (593), and execution of a send function (592) that can be a blocking method or a method that runs in a separate thread of execution. Such provided senders are typically specific to a particular software application in that any particular sender is provided to couple for data communications, not only to a particular application, but in many installations, to a particular instance of an application. In addition, such provided senders typically are specific to a particular software application in that such senders are designed and developed either to carry out translation of data formats having structures unique to a particular software application or to know that translation is not needed for integration of the application with which such a provided sender is designed to communicate. Such provided senders are typically specific to a particular communications protocol in that the sender itself is designed and programmed as software to implement or utilize a particular data communications protocol, HTTP, SOAP, IIOP, TCP/IP, SMTP, POP, and so on, where the terms 'implement' and 'utilize' have the same meaning described just above for receivers.

The method of FIG. 12 also includes providing (354) one or more transports (362), each transport having the capability of configuring itself, in dependence upon configuration parameters from a profile, with a receiver and a sender. Providing predefined data communications transports is carried out by designing and developing transports as software having the structures, characteristics, and capabilities of data communications and data format translation described in detail above in this disclosure. That is, providing predefined data communications transports is carried out, for example, in many embodiments of the present invention, by designing and developing software classes such as the example illustrated at FIG. 5c, having member methods for creating senders and receivers (556, 558). Such transports typically have the capability of configuring themselves using configuration parameters from a profile, for example, in the sense that their member methods for creating receivers and senders are parameterized factory methods that select among a multiplicity of concrete receiver and sender classes on the basis of one or more configuration parameters that are passed to the factory methods as call parameters, all as described in detail above in this disclosure.

The method of FIG. 12 also includes providing (356) a multiplicity of predefined transfer managers (364). Providing predefined transfer managers is carried out by designing and developing transfer managers as software having the structures, characteristics, and capabilities described in detail above in this disclosure. That is, providing predefined transfer managers is carried out, for example, in many embodiments of the present invention, by designing and developing software classes such as the example illustrated at FIG. 5f or FIG. 5g, having member data elements for storing configuration parameters (611, 615) and member methods for configuration (621) and for processing messages (618, 609). Some transfer managers are specific to particular pairs of the software applications integrated by an adapter, as, for example, when a transfer manager is programmed to carry out a data transformation from a data structure of one application to a data structure for another application, as described in detail above in this disclosure. Some transfer managers are not specific to particular applications or pairs of applications, as, for example, a data manger that carries out a security check in the same way for messages from or to many applications.

The method of FIG. 12 also includes providing (210) an adapter profile (202) identifying (352) communications transports, including receivers and senders, and, optionally, one or more transfer managers, wherein the adapter profile includes configuration parameters for the data communications transports and the transfer managers. As described above in this disclosure, in many embodiments of adapters according to embodiments of the present invention, providing (210) a profile is carried out by a user's or developer's typing into a text file designated for use as a profile, through a word processor or text editor, a representation of a data structure describing components of an adapter. The representation can be any encoding of data structure, including, for example, XML, C structures, C++ structures, stringified Java classes or objects, SGML (the Standard Generalized Markup Language), and others as will occur to those of skill in the art. Providing profiles is explained in more detail below in this disclosure with respect to FIG. 13.

The method of FIG. 12 also includes constructing (204) an application integration adapter (102) in dependence upon the profile (150), wherein the adapter comprises the transports (212), receivers (312), senders (316), and the transfer managers (406), if any, identified (352) in the profile (202). In typical embodiments of the present invention, constructing an adapter includes providing (371) an adapter (102) by designing and developing adapters as software having the structures, characteristics, and capabilities described in detail above in this disclosure. That is, providing adapters is carried out, for example, in many embodiments of the present invention, by designing and developing software classes such as the example illustrated at FIGS. 5 and 5a, having member data elements for storing, for example, a filename of a profile (510), a reference to a parsed version of a profile in computer memory (512), a list of references to transfer managers (514), a list of references to receivers (516), a list of references to senders (518), and a route map (534). Software classes defining adapters according to such exemplary embodiments also typically included member methods that parse profiles (522), create transports (524), and create transfer managers (530). The example of FIG. 5A includes member methods for configuring receivers and senders (526, 528), although, receivers and senders such as those exemplified in FIGS. 5f and 5e, have their own configuration methods that are called in many embodiments directly from an adapter's constructor or its main( ) member method (520).

Constructing (204) of an application integration adapter, is, for a further example, in many embodiments of the present invention that implement adapters as Java classes having attributes similar to those illustrated in the class diagrams of FIGS. 5 and 5A–5H, initiated by a command line interface entry having a form similar to the following example:

Java com.adapters.Adapter<ProfileName>

As mentioned above, this example command instructs a Java Virtual Machine to load and instantiate an adapter named "Adapter" and run its main( ) member method (reference 520 on FIG. 5a). Either the adapter's constructor, or its main( ) method, or both in cooperation, then carry out the constructive steps of setting up the adapter including reading the profile and instantiating and configuring the software modules identified in the profile using the configuration parameters from the profile, setting up adapters, transports, receivers, senders, transfer managers, and so on, all as described in detail above in this disclosure.

In the method of FIG. 12, the configuration parameters of a profile include identifications of data communications protocols and identifications of software applications. In exemplary embodiments of the present invention where the configuration parameters include identifications of data communications protocols and identifications of software applications, providing (210) an adapter profile (202) further comprises inserting (370) into the adapter profile identifications (368) of data communications protocols and identifications of software applications (366). In some examples, identifications of software applications are names and in some examples also version numbers of software applications as such. Identifications of software applications, however, need not be names or version numbers of software applications as such, but in some embodiments are file names, class names, identification codes, or configuration parameters that effectively identify an application to a profile, to an adapter reading a profile, or to other modules within an adapter. Transports in many embodiments, for example, provide factory methods that identify particular receivers and senders based upon identifications of protocols and applications, or their configuration parameters, where a profile includes no specific identification of a particular receiver or sender as such.

In embodiments where providing (210) an adapter profile (202) includes inserting (370) into the adapter profile identifications (368) of data communications protocols, inserting (370) into the adapter profile (202) identifications (368) of data communications protocols typically also includes inserting data communication parameters for the data communication protocols. In some embodiments, data communication parameters explicitly name a protocol. In other embodiments, the identity of a protocol is inferred from the configuration parameters. Either way, in most embodiments, a profile effectively identifies one or more communications protocols, either explicitly through names or identification codes, or implicitly through appropriate configuration parameters and file names or class names. More specific examples of the use of identification codes, class names, configuration parameters, and the like, are set forth, particularly in the exemplary XML profiles, above in this disclosure.

Figure 13:
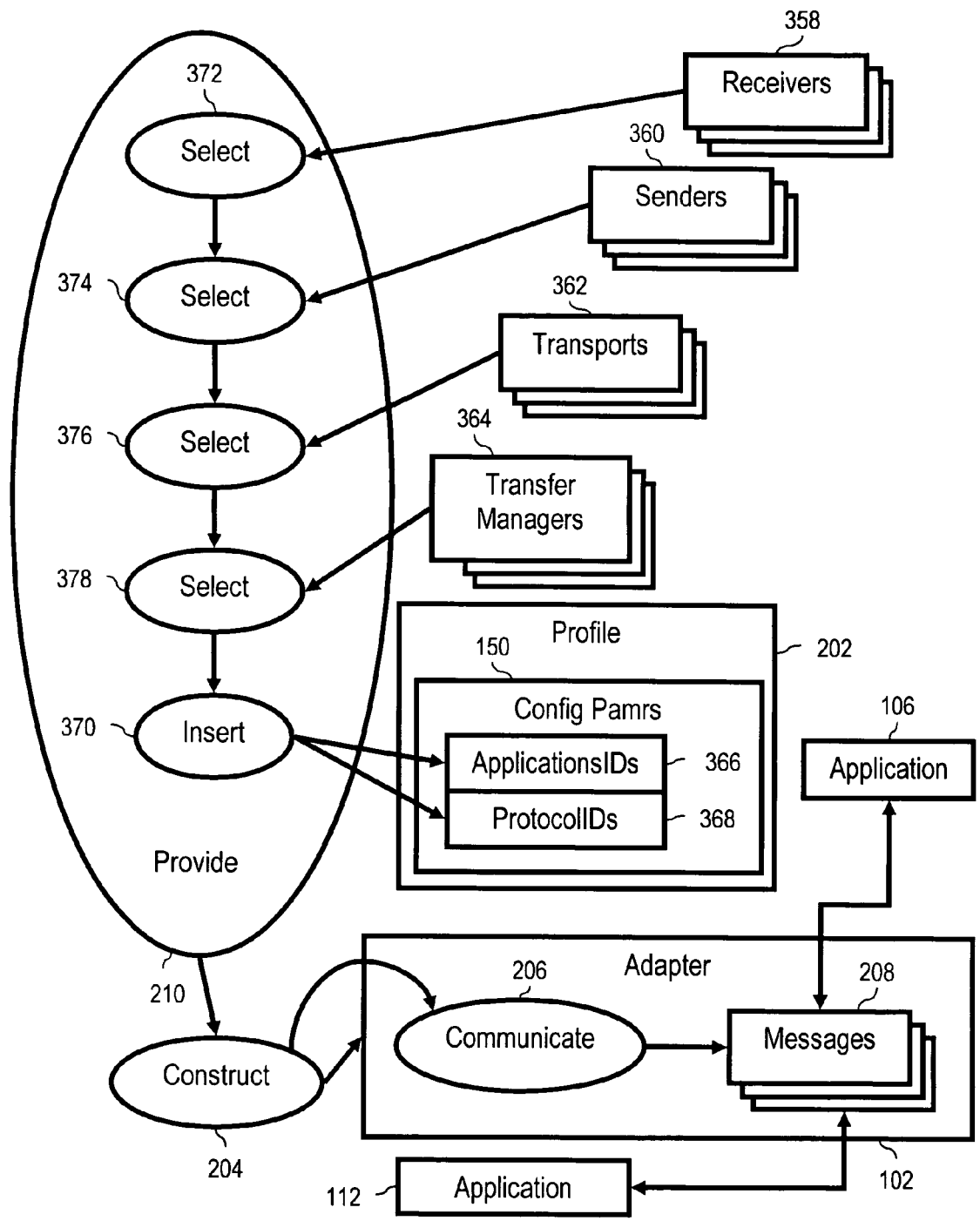
FIG. 13 sets forth a data flow diagram providing a more detailed illustration of on exemplary process for providing an adapter profile.

FIG. 13 sets forth a data flow diagram providing a more detailed illustration of on exemplary process for providing (210) an adapter profile (202). More particularly, Figure sets forth a data flow diagram illustrating an exemplary method of providing (210) an adapter profile (202) that includes selecting (372) two or more of the provided predefined data communications receivers (358) for inclusion in the adapter (102). Selecting (372) predefined data communications receivers (358) for inclusion in the adapter (102) is carried out in some exemplary embodiments by a developer's or user's examining a list of predefined receivers installed as files in a subdirectoryon a file system, predefined receivers having filenames such as, for example:

HTTPReceiverForSomeApplication.java,
SOAPReceiverForSomeOtherApplication.java,
IIOPReceiverForStillAnotherApplication.java,
TCPIPReceiverForAFourthApplication.java, and so on. In some examples, a developer or user examines the contents of the subdirectory through an interface, a command line interface or a GUI such as for example Microsoft's Windows Explorer™ and then types the file name for a predefined receiver into a text profile such as those illustrated in XML above in this disclosure.

In other examples, a developer or user uses a profile-generation utility program designed and programmed to provide convenient lists as pull down menus, scrolling lists, and the like, through a modern GUI so that the user or developer can conveniently point and click with a mouse to chose predefined receivers for inclusion in a profile. Such profile-generation utility programs are parameterized with the subdirectories where source code files of predefined receivers and other adapter components are stored. Such profile-generation utility programs provide the service, after components of an adapter are selected by a user or developer, of automatically generating a profile, such as, for example, an XML profile similar to the ones illustrated above in this disclosure. In addition, such profile-generation utility programs often provide GUI displays of lists of available software applications, communications protocols, and transfer management functions (data translation, security, authentication, message privacy controls, and so on)—and then generate a profile under automation in dependence upon a user's or developer's selection through the GUI of various combinations of applications, communications protocols, and transfer management functions. One of the benefits of using such profile-generation utility programs is that their output need not be limited to text profiles such as XML, but instead can be implemented with binary control codes or even encrypted encodings, so that developers who wish for any reason to do so are aided in implementing opaque adapter profiles rather than the relatively transparent ones described for explanatory purposes above in this disclosure.

The method of FIG. 13 also includes selecting (374) two or more of the provided predefined data communications senders (360) for inclusion in the adapter (102), wherein the selected senders are specific to the same software applications to which the receivers are specific. It is useful to select senders for the same applications to which the receivers are specific so that an adapter can both send and receive messages to and from the same applications. In typical embodiments, selecting (374) predefined data communications senders (360) for inclusion in an adapter (102) is carried out in a similar fashion as for selecting (372) predefined receivers (358), that is, by directly perusing the contents of subdirectories where source code files for predefined senders are stored, perusing other lists of components, typing selections directly into a profile through a text editor or word processor, or by use of a profile-generation utility program.

In the method according to FIG. 13, providing (210) an adapter profile (202) also includes selecting (376) two or more of the provided predefined data transports (362) for inclusion in the adapter (102). In typical embodiments, selecting (376) predefined data transports (362) for inclusion in an adapter (102) is carried out in a similar fashion as for selecting predefined receivers and predefined senders, that is, by directly perusing the contents of subdirectories where source code files for predefined transports are stored, perusing other lists of components, typing selections directly into a profile through a text editor or word processor, or by use of a profile-generation utility program.

In the method of FIG. 13, providing (210) an adapter profile (202) further comprises selecting (378) one or more of the provided predefined transfer managers (364). In typical embodiments, selecting (378) predefined transfer managers (364) for inclusion in an adapter (102) is carried out in a similar fashion as for selecting predefined receivers and predefined senders, that is, by directly perusing the contents of subdirectories where source code files for predefined transfer managers are stored, perusing other lists of components, typing selections directly into a profile through a text editor or word processor, or by use of a profile-generation utility program. In such embodiments, some transfer managers are specific to particular applications, such as, for example, transfer mangers that carry out data transformations. Some embodiments of transfer managers are not specific to particular applications, however, such as, for example, transfer managers that carry out similar or identical security checks for all message traffic through an adapter.

The method of FIG. 13 also includes communicating integration messages among applications through the adapter. Communicating integration messages among applications through the adapter includes receiving messages, translating message formats as needed, performing security checks, data transformations, and other transfer management services as needed, and sending the messages to destination applications, all as described in detail above in this disclosure.

In some implementations of adapters according to embodiments of the present invention, all components transports, receivers, senders, transfer managers, and so on, to be provided as modular components and used in a plug-and-play fashion to build application integration adapters are, or will be, fully defined and developed prior to any particular implementation of any particular adapter. As readers will have begun to realize by now, it is a particular advantage of the present invention that in those instances when some but not all of the components of an adapter are predefined, nevertheless, the development of a particular adapter is greatly simplified because only the missing parts need be developed, so that in such exemplary embodiments, the newly developed components are then also provided as modular components and used in a plug-and-play fashion to build application integration adapters along with the predefined components. This pattern is particularly evident when a user organization possesses some predefined components, but needs to create others, as, for example, when a transport is needed for a legacy application not yet addressed by previous adapter configurations.

Figure 14:
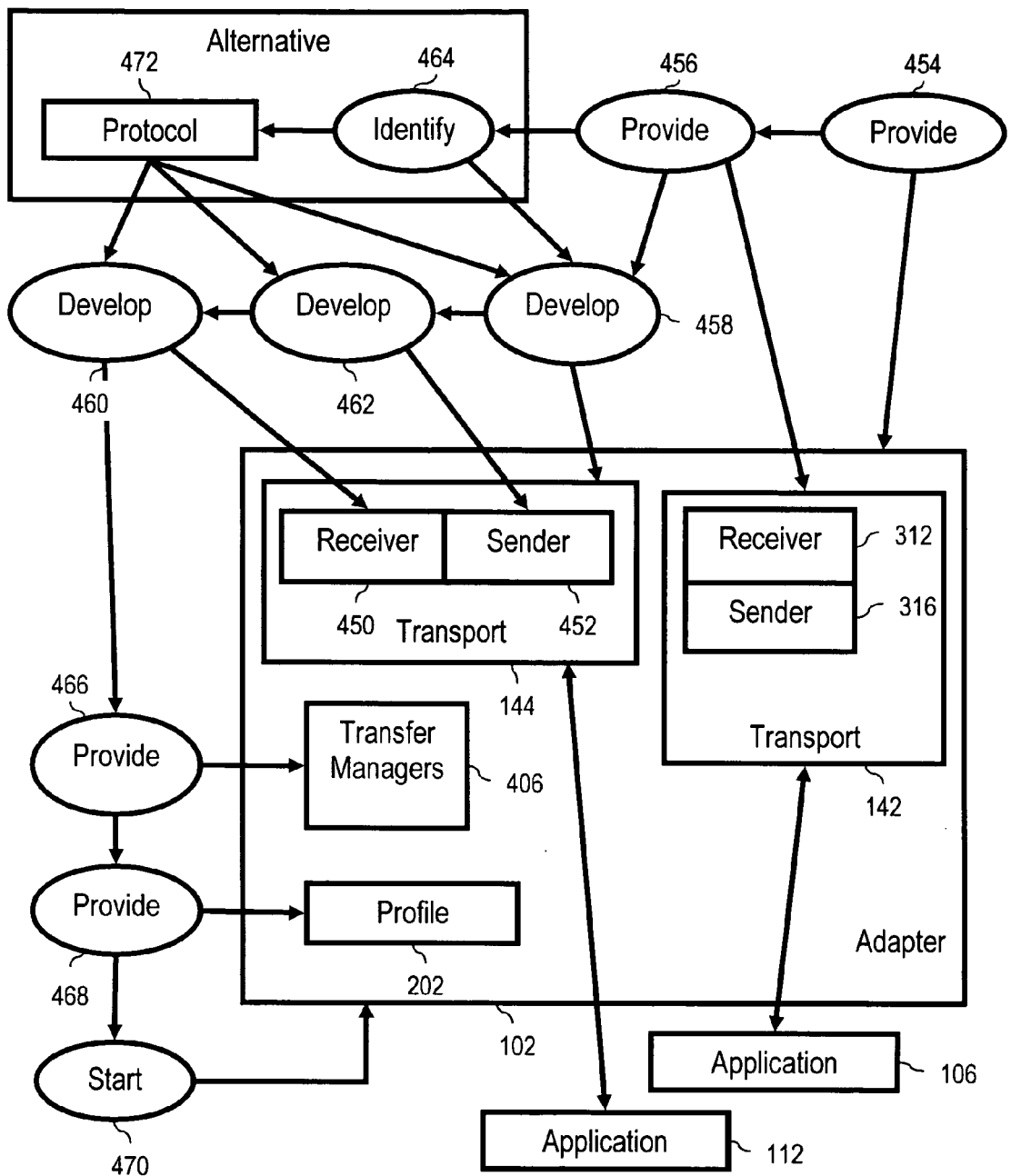
FIG. 14 sets forth a data flow diagram of a method of application integration by which the modular, plug-and-play aspects of adapters according the present invention are further explained with respect to the exemplary instances where some but not all of an adapter's components are predefined.

FIG. 14 sets forth a data flow diagram of a further exemplary method of application integration by which the modular, plug-and-play aspects of adapters according the present invention are further explained with respect to the exemplary instances where some but not all of an adapter's components are predefined. More particularly, FIG. 14 sets forth a data flow diagram illustrating an exemplary method of application integration that includes providing (454) a predefined adapter (102). Providing (454) a predefined adapter (102) is carried out in typical embodiments by designing and developing adapters as software having the structures, characteristics, and capabilities described in detail above in this disclosure. That is, providing predefined adapters is carried out, for example, in many embodiments of the present invention, by designing and developing software classes such as the example illustrated at FIGS. 5 and 5a, having member data elements for storing, for example, a filename of a profile (510), a reference to a parsed version of a profile in computer memory (512), a list of references to transfer managers (514), a list of references to receivers (516), a list of references to senders (518), and a route map (534). Software classes defining adapters according to such exemplary embodiments also typically included member methods that parse profiles (522), create transports (524), and create transfer managers (530). The example of FIG. 5A includes member methods for configuring receivers and senders (526, 528), although, receivers and senders such as those exemplified in FIGS. 5f and 5e, have their own configuration methods that are called in many embodiments directly from an adapter's constructor or its main( ) member method (520).

In typical embodiments, providing (454) a predefined adapter (102) includes storing in a subdirectory in a file system a file containing the source code or executable code for such a predefined adapter so that it is available to a user or developer to be selected for inclusion in a profile. In typical embodiments, selecting an adapter for inclusion in a profile is carried out in a similar fashion as for selecting predefined receivers, predefined senders, predefined transports, and other adapter components, that is, by directly perusing the contents of subdirectories where source code files for predefined adapters are stored, perusing other lists of components, typing selections directly into a profile through a text editor or word processor, or by use of a profile-generation utility program.

The method of FIG. 14 also includes providing (456) a predefined transport (142), receiver (312), and sender (316) for a first application (106). Providing predefined transports, receivers, and senders is carried out by designing and developing transports, receivers, and senders as software having the structures, characteristics, and capabilities of data communications and data format translation described in detail above in this disclosure.

In this example, the second application is one not previously integrated through this adapter, so that a new transport, receiver, and sender, and possibly one or more transfer managers, must be developed for it. The method of FIG. 14 therefore also developing (458) a transport (144) for a second application (112); developing (462) a new sender (452) for the second application (112); developing (460) a new receiver (450) for the second application (112); and optionally providing (466) transfer managers (406) for the second application (112). Developing new transports, receivers, senders, and transfer managers is carried out by designing and developing new transports, receivers, senders, and transfer managers as software having the structures, characteristics, and capabilities of data communications and data format translation described in detail above in this disclosure.

Providing (466) transfer managers is described as 'providing' rather than developing because some embodiments can provide transfer managers for a new application without developing new ones, as, for example, in an embodiment where there is no data transformation to be carried out within an adapter for a new application but there is a security check which is carried the same way with the same transfer manager, previously developed and currently existing, for all applications integrated by the adapter, including the new one. To the extent that it is not feasible in any particular example of integrating a new application to provide needed transfer managers without developing new ones, then providing (466) transfer managers includes developing new ones as needed, carried out as described above in this disclosure.

The method of FIG. 14 is illustrated as including an alternative path of execution (464, 472) that includes identifying (464) a communications protocol (472) for a second application (112). In many embodiments, both sender and receiver for a new application (112) will use the same communications protocol, hence the illustration of FIG. 13 where the develop steps (458, 460, and 462) are shown occurring in dependence upon the same protocol (472), shown this way only for explanation because, although they often will do so, it is not a limitation of the invention that a receiver and sender for a new application use the same communications protocol.

The method of FIG. 14 also includes providing (468) an adapter profile (202) identifying at least the two predefined communications transports, including the senders and receivers, and, optionally, one or more transfer managers, wherein the adapter profile includes configuration parameters for the data communications transports and the optional transfer managers. Providing (468) an adapter profile (202) is carried out by designing and developing a profile having the structures, characteristics, and capabilities described in detail above in this disclosure. In some embodiments of integrating a new application with applications for which adapter components already exist, a profile may already exist. If a profile for integrating previously integrated applications exists, then providing a profile can comprise altering the existing profile to include a new transport, sender, receiver, and transfer managers as needed for the new application. Either way, whether a profile is to be provided on the foundation of an existing profile or is to be developed as a new profile, providing the profile can be carried out by use of a text editor, word processor, or profile-generation utility program as described above.

The method of FIG. 14 also includes starting (470) the adapter (102), which, in the example of a Java adapter, can be carried out, for example, by entering through a command line interface:

Java myAdapter<myProfile>, a mode of starting an adapter which effectively 'constructs' the adapter, or rather causes the adapter to self-construct and execute or run as described in detail above in this disclosure, including reading and parsing a profile, instantiating, configuring, and running transports, receivers, senders, transfer managers, and so on. More particularly, in adapters that implement application integration according to the method of FIG. 14, starting (470) the adapter (102) typically comprises creating transports identified in an adapter profile; configuring the transports in accordance with configuration parameters from the profile; creating any transfer managers identified in the profile; and configuring instantiated transfer managers in dependence upon the configuration parameters. In adapters that implement application integration according to the method of FIG. 14, configuring the transports, explained in terms of the class structures of FIGS. 5A–5H, typically includes creating a receiver for each transport; creating a transport event listener (in adapters that use asynchronous receivers in separate threads); registering the transport event listener, if any, with each receiver; and creating a sender for each transport. In such embodiments, transports usually comprise factory methods for creating senders and receivers, as described in more detail above in this disclosure, and adapters often comprise factory methods for creating transfer managers.

Develop New Receiver—Data Communications

In adapters that implement application integration according to the method of FIG. 14, developing (460) a new receiver (450) for the second application (112) typically comprises programming the new receiver to administer data communication between the second application and the adapter in accordance with a communications protocol for the second application. Some receivers, such as, for example, those that actually implement all or a portion of a protocol, HTTP, SOAP, TCP/IP, or others, need actual source code, programming for the protocol. As described in detail above, other receivers can utilizing a protocol rather than actually implementing the protocol, as, for example, receivers implemented with attendant interoperable object references made available to the application program with which the receiver is designed to communicate so that the application can communicate with the receiver by making IIOP calls or Java RMI calls. In this sense, receivers (450) developed (460) for a new application (112) according to the method of FIG. 14 are programmed to administer data communications between the second application and the adapter in accordance with a communications protocol for the second application, even in those receivers that do not actually implement the second protocol.

Develop New Receiver—Map to Destination

In some adapters that implement application integration according to the method of FIG. 14, developing (460) a new receiver (450) for the second application (112) comprises programming a mapping of data elements of the second application from a source message format to a destination message format useful to the destination application. Programming a mapping of data elements of the second application from a source message format to a destination message format useful to the destination application is an example of what is referred to above in this disclosure as data format translation, that is, a process that affects format without affecting data structure, data element names, types, and values. Programming a mapping of data elements of the second application from a source message format to a destination message format useful to the destination application is particularly useful in, although not limited to, embodiments in which one application (a source application) provides message traffic in one format (a source format), an application to which the messages are sent (a destination application) requires a different format (a destination format), and no data transformation is needed. That no data transformation is needed means that the data structures, the data element names, types, and values, are the same in both message formats. An example of disparate source and destination formats is, for example, when the source format is stringified Java and the destination format is XML.

Develop New Receiver—Map to Interim

In some adapters that implement application integration according to the method of FIG. 14, developing (460) a new receiver (450) for the second application (112) comprises programming a mapping of data elements of the second application from a source message format to an interim message format useful for internal processing within the adapter. Programming a mapping of data elements of the second application from a source message format to an interim message format useful for internal processing within the adapter is particularly useful in embodiments in which the source message structure is different from a required destination message structure of a message. In such embodiments, as described in more detail above in this disclosure, it is advantageous to develop software modules capable of conducting data transformation of any supported combination of data structures, element names, types, and values, by, for example, developing and providing transfer managers according to embodiments of the present invention. Such modules or transfer managers advantageously accept as inputs message data structures in data formats with which such modules or transfer managers are designed to operate, despite the fact that a message as received by a receiver can be in any known data format: hence the usefulness of programming a mapping of data elements of the second application from a source message format to an interim message format useful for internal processing within the adapter. Once again, programming a mapping of data elements of the second application from a source message format to an interim message format useful for internal processing within the adapter comprises an example of data transformation, not data translation; that is, it is a process that typically does not affect data structure, element names, types, or values.

Develop New Sender—Data Communications

In some adapters that implement application integration according to the method of FIG. 14, developing (462) a new sender (452) for the second application (112) comprises programming the new sender to administer data communications between the second application and the adapter in accordance with the identified communications protocol for the second application. Some senders, such as, for example, those that actually implement all or a portion of a protocol, HTTP, SOAP, TCP/IP, or others, need actual source code, programming for the protocol. As described in detail above, other senders can utilize a protocol rather than actually implementing the protocol, as, for example, senders implemented with attendant interoperable object references made available to the sender for calling the application program with which the sender is designed to communicate so that the sender can communicate with the application by making IIOP calls or Java RMI calls. In this sense, senders (452) developed (462) for a new application (112) according to the method of FIG. 14 are programmed to administer data communications between the second application and the adapter in accordance with a communications protocol for the second application, even in those senders do not actually implement the second protocol.

Develop New Sender—Map from Destination

In some adapters that implement application integration according to the method of FIG. 14, developing (462) a new sender (452) for the second application (112) comprises programming a mapping of data elements of the second application from a destination message format useful to the destination application to a source message format. Programming a mapping of data elements of the second application from a source destination format useful to the destination application to a source message format is an example of what is referred to above in this disclosure as data format translation, that is, a process that affects format without affecting data structure, data element names, types, and values. Programming a mapping of data elements of the second application from a source destination format useful to the destination application to a source message format is particularly useful in, although not limited to, embodiments in which one application (a destination application) provides return message traffic or acknowledgments, responding to messages from a source application, in one format (a destination format), an application to which the return messages are sent (a source application) requires a different format (a source format), and no data transformation is needed. That no data transformation is needed means that the data structures, the data element names, types, and values, are the same in both message formats. An example of disparate source and destination formats is, for example, when the source format is stringified Java and the destination format is XML.

Develop New Sender—Map from Interim

In some adapters that implement application integration according to the method of FIG. 14, developing (462) a new sender (452) for the second application comprises programming a mapping of data elements of the second application from an interim message format useful for data translation to a source message format. Programming a mapping of data elements of the second application from an interim message format useful for data translation to a source message format is particularly useful in embodiments in which the source message structure is different from a destination message structure of a return message or acknowledgement transmitted from the destination to the source. In such embodiments, as described in more detail above in this disclosure, it is advantageous to develop software modules capable of conducting data transformation of any supported combination of data structures, element names, types, and values, by, for example, developing and providing transfer managers according to embodiments of the present invention. Such modules or transfer managers advantageously accept as inputs message data structures in data formats with which such modules or transfer managers are designed to operate, despite the fact that a message as received by a receiver can be in any known data format: hence the usefulness of programming a mapping of data elements of the second application from an interim message format useful for data translation to a source message format. Once again, programming a mapping of data elements of the second application from an interim message format useful for data translation to a source message format comprises an example of data transformation, not data translation; that is, it is a process that typically does not affect data structure, element names, types, or values.

Develop New Transfer Manager

In some adapters that implement application integration according to the method of FIG. 14, providing (466) transfer managers (406) further comprises providing a predefined transfer manager for the second application. In some adapters that implement application integration according to the method of FIG. 14, providing (466) transfer managers (406) further comprises developing a new transfer manager for the second application. Providing predefined transfer managers is carried out, for example, by designing and developing transfer managers as software modules having the structures, characteristics, and capabilities of data communications and data format translation described in detail above in this disclosure. As mentioned earlier, some embodiments can provide transfer managers for a new application without developing new ones, as, for example, in an embodiment where there is no data transformation to be carried out within an adapter for a new application but there is a security check which is carried the same way with the same transfer manager, previously developed and currently existing, for all applications integrated by the adapter, including the new one.

Develop New Transfer Manager—Map To Destination

To the extent that it is not feasible in any particular example of integrating a new application to provide needed transfer managers without developing new ones, then providing (466) transfer managers includes developing new ones as needed, carried out as described above in this disclosure. In some adapters that implement application integration according to the method of FIG. 14, therefore, developing (466) a new transfer manager (406) for the second application (112) includes programming, in an interim message format, a transformation of the data elements from the second application (112, viewed for example as a source of message traffic) into data elements useful in the first application (106, viewed conventionally as a destination).

Develop New Transfer Manager—Map From Destination

In some adapters that implement application integration according to the method of FIG. 14, there is message traffic not only from a source application (112) to a destination application (106), but also the reverse, such as, for example, return messages or acknowledgement from a destination application (106, conventionally so viewed from the point of view of the other application in the integration in question) to a source application (112, merely the other application in the particular integration). Of course which application is the source and which is the destination can depend on point of view. The point is that message traffic can go both ways, and therefore data transformation can be needed in both directions. In some adapters that implement application integration according to the method of FIG. 14, therefore, developing (466) a new transfer manager (406) for the second application includes programming, in the interim message format, a transformation of the data elements from the first application (106) into data elements useful in the second application (112).

Asynchronous Development and Installation of Application Integration Adapter and Their Components It is useful for purposes of further explanation to point out some further useful effects and aspects of development and installation of application integration adapters according to embodiments of the present invention. One useful aspect of such adapters is that adapters can be developed and installed asynchronously with respect to any of their components. Consider an example in which an adapter integrating two applications is installed and operating, perhaps for years, and a third application is to be installed for integration with the first two. The third application need not even have existed when the adapter was developed and installed for the first two applications. In the present, however, a transport, receiver, sender, and a transfer manager if needed can be developed and installed in the running adapter without ever pausing, stopping, or rebooting its operation, by, for example, the use of administrative integration messages as described in detail above in this application.

Even stronger is that adapters according to embodiments of the present invention can be installed asynchronously with the provision of a profile—or asynchronously at least with the provision of a profile describing any transports, receivers, or senders for particular applications. That is, just as an adapter can be started with two application and accept later instructions for alteration that add a third application, an adapter can be started with zero applications and accept later instructions for alteration that add two applications, all enabled with transports, receivers, senders, and so on. For adapters that detect administrative integration messages by comparing a profile with an earlier copy of a profile, the adapter can start, instantiate a change detector, instantiate no transports, no receivers, no senders, and no transfer managers, and still be running perfectly—because as soon as transports, receivers, senders, and transfer managers are added to the profile, their presence as instructions for alteration will be detected and the adapter will be alter itself to include them. Similarly, an adapter that accepts administrative integration messages can be started with only one transport and only one receiver, the receiver being dedicated to receiving and passing on administrative integration message from any source application through a data communications link whose address or availability is made known to the installer of the applications. Any application wishing to do so can then communicate its instructions for altering the adapter to meet the integration needs of that application, even if that application did not even exist when the adapter was first installed and started.

It will be understood from the foregoing description that various modifications and changes may be made, and in fact will be made, in the exemplary embodiments of the present invention without departing from its true spirit. The descriptions in this specification are for purposes of illustration only and are not to be construed in a limiting sense. The scope of the present invention is limited only by the language of the following claims.

What is claimed is:

1. A method of application integration, the method comprising:
   providing a multiplicity of predefined data communications receivers, each receiver specific to a software application and a communications protocol;
   providing a multiplicity of predefined data communications senders, each sender specific to a software application and a communications protocol;
   providing one or more data communications transports, each transport having the capability of configuring itself, in dependence upon configuration parameters from an adapter profile, with a receiver and a sender;
   providing a multiplicity of predefined transfer managers;
   providing the adapter profile identifying the transports, including the receivers and the senders, and, optionally, one or more transfer managers, wherein the adapter profile includes configuration parameters for the transports and the transfer managers; and
   constructing an application integration adapter in dependence upon the profile, wherein the adapter comprises the transports the receivers, the senders, and the transfer managers identified in the profile.

2. The method of claim 1 wherein the configuration parameters include identifications of data communications protocols and identifications of software applications.

3. The method of claim 2 wherein providing an adapter profile further comprises inserting into the adapter profile identifications of data communications protocols and identifications of software applications.

4. The method of claim 3 wherein inserting into the adapter profile identifications of data communications protocols further comprises inserting data communication parameters for the data communication protocols.

5. The method of claim 1 wherein providing an adapter profile further comprises:
selecting two or more of the provided predefined data communications receivers for inclusion in the adapter; and
selecting two or more of the provided predefined data communications senders for inclusion in the adapter, wherein the selected senders are specific to the same software applications to which the receivers are specific.

6. The method of claim 1 wherein providing an adapter profile further comprises selecting two or more of the provided predefined data transports for inclusion in the adapter.

7. The method of claim 1 wherein providing an adapter profile further comprises selecting one or more of the provided predefined transfer managers.

8. The method of claim 1 further comprising communicating integration messages among applications through the adapter.

9. A system for application integration, the system comprising:
a computer memory operatively coupled to the computer processor, the computer memory having disposed within it;
means for providing a multiplicity of predefined data communications receivers, each receiver specific to a software application and a communications protocol;
means for providing a multiplicity of predefined data communications senders, each sender specific to a software application and a communications protocol;
means for providing one or more data communications transports, each transport having the capability of configuring itself, in dependence upon configuration parameters from an adapter profile, with a receiver and a sender;
means for providing a multiplicity of predefined transfer managers;
means for providing the adapter profile identifying the transports, including the receivers and the senders, and, optionally, one or more transfer managers, wherein the adapter profile includes configuration parameters for the transports and the transfer managers; and
means for constructing an application integration adapter in dependence upon the profile, wherein the adapter comprises the transports, the receivers, the senders, and the transfer managers identified in the profile.

10. The system of claim 9 wherein the configuration parameters include identifications of data communications protocols and identifications of software applications.

11. The system of claim 10 wherein means for providing an adapter profile further comprises means for inserting into the adapter profile identifications of data communications protocols and identifications of software applications.

12. The system of claim 11 wherein means for inserting into the adapter profile identifications of data communications protocols further comprises means for inserting data communication parameters for the data communication protocols.

13. The system of claim 9 wherein means for providing an adapter profile further comprises:
means for selecting two or more of the provided predefined data communications receivers for inclusion in the adapter; and
means for selecting two or more of the provided predefined data communications senders for inclusion in the adapter, wherein the selected senders are specific to the same software applications to which the receivers are specific.

14. The system of claim 9 wherein means for providing an adapter profile further comprises means for selecting two or more of the provided predefined data transports for inclusion in the adapter.

15. The system of claim 9 wherein means for providing an adapter profile further comprises means for selecting one or more of the provided predefined transfer managers.

16. The system of claim 9 further comprising means for communicating integration messages among applications through the adapter.

17. A computer program product for application integration, the computer program product comprising:
a recording medium;
means, recorded on the recording medium, for providing a multiplicity of predefined data communications receivers, each receiver specific to a software application and a communications protocol;
means, recorded on the recording medium, for providing a multiplicity of predefined data communications senders, each sender specific to a software application and a communications protocol;
means, recorded on the recording medium, for providing one or more data communications transports, each transport having the capability of configuring itself, in dependence upon configuration parameters from an adapter profile, with a receiver and a sender;
means, recorded on the recording medium, for providing a multiplicity of predefined transfer managers;
means, recorded on the recording medium, for providing the adapter profile identifying the transports, including the receivers and the senders, and, optionally, one or more of the transfer managers, wherein the adapter profile includes configuration parameters for the transports and the transfer managers; and
means, recorded on the recording medium, for constructing an application integration adapter in dependence upon the profile, wherein the adapter comprises the transports, the receivers, the senders, and the transfer managers identified in the profile.

18. The computer program product of claim 17 wherein the configuration parameters include identifications of data communications protocols and identifications of software applications.

19. The computer program product of claim 18 wherein means, recorded on the recording medium, for providing an adapter profile further comprises means, recorded on the recording medium, for inserting into the adapter profile identifications of data communications protocols and identifications of software applications.

20. The computer program product of claim 19 wherein means, recorded on the recording medium, for inserting into the adapter profile identifications of data communications protocols further comprises means, recorded on the recording medium, for inserting data communication parameters for the data communication protocols.

21. The computer program product of claim 17 wherein means, recorded on the recording medium, for providing an adapter profile further comprises:
- means, recorded on the recording medium, for selecting two or more of the provided predefined data communications receivers for inclusion in the adapter; and
- means, recorded on the recording medium, for selecting two or more of the provided predefined data communications senders for inclusion in the adapter, wherein the selected senders are specific to the same software applications to which the receivers are specific.

22. The computer program product of claim 17 wherein means, recorded on the recording medium, for providing an adapter profile further comprises means, recorded on the recording medium, for selecting two or more of the provided predefined data transports for inclusion in the adapter.

23. The computer program product of claim 17 wherein means, recorded on the recording medium, for providing an adapter profile further comprises means, recorded on the recording medium, for selecting one or more of the provided predefined transfer managers.

24. The computer program product of claim 17 further comprising means, recorded on the recording medium, for communicating integration messages among applications through the adapter.

* * * * *